US010155670B1

(12) United States Patent
Happel

(10) Patent No.: US 10,155,670 B1
(45) Date of Patent: Dec. 18, 2018

(54) STORMWATER POLYMER TREATMENT SYSTEM

(71) Applicant: Tom Happel, Cocoa, FL (US)

(72) Inventor: Tom Happel, Cocoa, FL (US)

(73) Assignee: Suntree Technologies Holdings, LLC, Cocoa, FL (US)

( * ) Notice: Subject to any disclaimer, the term of this patent is extended or adjusted under 35 U.S.C. 154(b) by 0 days.

(21) Appl. No.: 15/686,931

(22) Filed: Aug. 25, 2017

Related U.S. Application Data

(63) Continuation-in-part of application No. 15/658,864, filed on Jul. 25, 2017, which is a continuation-in-part
(Continued)

(51) Int. Cl.
  *E03F 5/14* (2006.01)
  *B01D 21/01* (2006.01)
  (Continued)

(52) U.S. Cl.
  CPC .......... *C02F 1/004* (2013.01); *B01D 21/0012* (2013.01); *B01D 21/0042* (2013.01);
  (Continued)

(58) Field of Classification Search
  CPC ..... E03F 5/0402; E03F 5/0403; E03F 5/0404; E03F 5/14; B01D 21/0012;
  (Continued)

(56) References Cited

U.S. PATENT DOCUMENTS

| 2,010,540 A | 8/1935 | Evans |
| 4,024,881 A | 5/1977 | Weiland |

(Continued)

FOREIGN PATENT DOCUMENTS

| CA | 2455239 | 7/2005 |

OTHER PUBLICATIONS

Applied Polymer Systems, Inc., Polymer Enhanced Best Management Practice (PEBMP) Application Guide, Revised 2016, 83 pages.
(Continued)

*Primary Examiner* — Christopher Upton
(74) *Attorney, Agent, or Firm* — Brian S. Steinberger; Law Offices of Brian S. Steinberger, P.A.

(57) ABSTRACT

Vaults, boxes, systems, and treatment methods to capture pollutants from stormwater runoff and prevent conveyance of the pollutants from entering a receiving water body or landscape area, which can be part of a permanent stormwater drainage infrastructure. A polymer system with at least one polymer log can be used to treat stormwater runoff and any stormwater conveyance, such as a pipe, box culvert, ditchline, and the like. Once stormwater has been dosed with polymers, the treatment easily retains the pollutants, and the one or more polymer logs continue to enhance water quality, while providing an easy method for servicing polymer logs without requiring service technicians to enter the vault. A hydroslide servicing system can include pivotal spray heads to pivot to parallel positions over a sloped floor to flush debris toward easy to reach locations to be vacuumed, and vertical spray heads which can break up debris bridges.

20 Claims, 21 Drawing Sheets

Related U.S. Application Data of application No. 15/639,685, filed on Jun. 30, 2017, application No. 15/686,931, which is a continuation-in-part of application No. 14/288,455, filed on May 8, 2014, now abandoned.

(60) Provisional application No. 62/506,188, filed on May 15, 2017, provisional application No. 61/828,958, filed on May 30, 2013.

(51) Int. Cl.

| | | |
|---|---|---|
| *C02F 1/56* | (2006.01) | |
| *C02F 1/00* | (2006.01) | |
| *C02F 1/40* | (2006.01) | |
| *C02F 1/52* | (2006.01) | |
| *B01D 21/00* | (2006.01) | |
| *E03F 5/04* | (2006.01) | |
| *B01D 21/24* | (2006.01) | |
| *C02F 103/00* | (2006.01) | |

(52) U.S. Cl.
CPC ......... *B01D 21/01* (2013.01); *B01D 21/2472* (2013.01); *C02F 1/40* (2013.01); *C02F 1/52* (2013.01); *C02F 1/56* (2013.01); *E03F 5/0402* (2013.01); *E03F 5/0404* (2013.01); *E03F 5/14* (2013.01); *C02F 2103/001* (2013.01); *C02F 2303/16* (2013.01)

(58) Field of Classification Search
CPC ............... B01D 21/0042; B01D 21/01; B01D 21/2472; C02F 1/40; C02F 1/56
USPC .... 210/702, 747.2, 747.3, 170.03, 209, 299, 210/305, 521, 523, 532.1, 538
See application file for complete search history.

(56) References Cited

U.S. PATENT DOCUMENTS

| | | | |
|---|---|---|---|
| 4,913,819 A | 4/1990 | Patterson | |
| 5,114,274 A | 5/1992 | Heiler | |
| 5,176,838 A | 1/1993 | Chin | |
| 5,228,983 A * | 7/1993 | Nims | B01D 21/0009 210/170.03 |
| 5,498,331 A | 3/1996 | Monteith | |
| 6,125,865 A | 10/2000 | Cochrane | |
| 6,270,663 B1 | 8/2001 | Happel | |
| 6,428,692 B2 | 8/2002 | Happel | |
| 6,797,162 B2 | 9/2004 | Happel | |
| 6,869,525 B1 | 3/2005 | Happel | |
| 6,979,148 B2 | 12/2005 | Happel | |
| 7,153,417 B2 | 12/2006 | Happel | |
| 7,270,747 B2 | 9/2007 | Happel | |
| 7,294,256 B2 | 11/2007 | Happel | |
| 7,549,820 B1 | 6/2009 | Happel | |
| 7,824,551 B2 | 11/2010 | Wanielista | |
| 7,846,327 B2 | 12/2010 | Happel | |
| 7,955,507 B2 | 6/2011 | Wanielista | |
| 7,959,799 B2 | 6/2011 | Happel | |
| 7,981,283 B2 | 7/2011 | Happel | |
| 8,002,984 B1 | 8/2011 | Wanielista | |
| 8,002,985 B1 | 8/2011 | Wanielista | |
| 8,034,234 B2 | 10/2011 | Happel | |
| 8,034,236 B1 | 10/2011 | Happel | |
| 8,034,237 B2 | 10/2011 | Happel | |
| 8,051,568 B2 | 11/2011 | Moody | |
| 8,083,937 B2 | 12/2011 | Happel | |
| 8,142,666 B1 | 3/2012 | Happel | |
| 8,153,005 B1 | 4/2012 | Wanielista | |
| 8,216,453 B2 | 7/2012 | Moody | |
| 8,231,780 B2 | 7/2012 | Happel | |
| 8,366,923 B1 | 2/2013 | Happel | |
| 8,393,827 B1 | 3/2013 | Happel | |
| 8,425,150 B1 | 4/2013 | Happel | |
| 8,491,797 B1 | 7/2013 | Happel | |
| 8,622,652 B1 | 1/2014 | Happel | |
| 8,651,767 B1 | 2/2014 | Happel | |
| 8,974,144 B1 | 3/2015 | Happel | |
| 9,068,312 B1 | 6/2015 | Happel | |
| 9,340,965 B2 | 5/2016 | Happel | |
| 9,534,368 B1 | 1/2017 | Happel | |
| 2004/0222170 A1 | 11/2004 | Hauge | |
| 2006/0086676 A1 | 4/2006 | Smith | |
| 2008/0006304 A1 | 1/2008 | Treherne | |
| 2009/0145829 A1* | 6/2009 | Happel | C02F 1/56 210/170.03 |
| 2012/0073675 A1 | 3/2012 | Dupuis | |
| 2014/0102479 A1 | 4/2014 | Steffen | |

OTHER PUBLICATIONS

Technical Guidance for the Use of Polyacrylamides (PAM) and PAM Blends for Soil Erosion Control and Storm Water Clarification, Applied Polymer Systems, Inc., Nov. 2002, 8 pages.
Applied Polymer Systems, Inc., APS 800 Series Pond Long, retrieved from http://siltstop.com/p.php?go=pinfo&PID=333-aps_800_series_pond_log, retrieved Aug. 28, 2017, 3 pages.
Applied Polymer Systems, Inc., Water Treatment, retrieved from http://siltstop.com/p.php?go=pinfo&PID=15-water_treatment, retrieved on Aug. 28, 2017, 8 pages.
Stormwater Best Management Practice, Polymer Flocculation, United States Environmental Protection Agency, Oct. 2013, http://www.siltstop.com/pictures/US_EPA_Polymer_Flocculant_Handout_3-14.pdf, 7 pages.

* cited by examiner

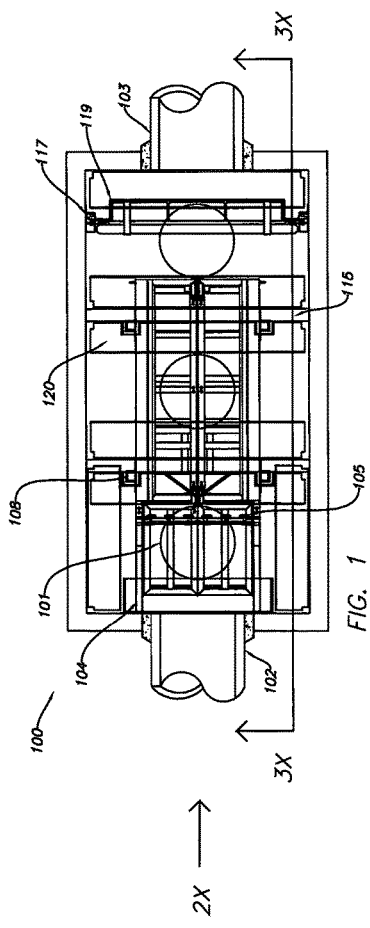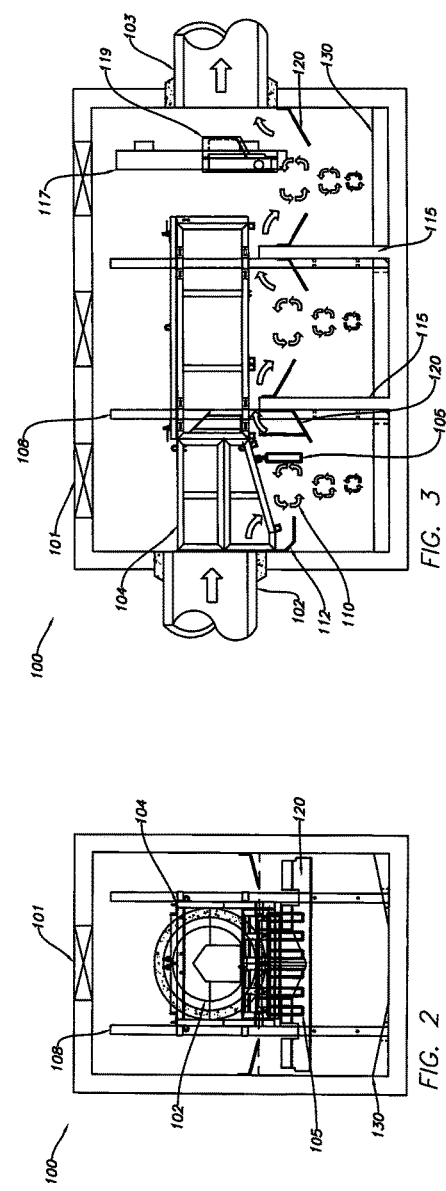
FIG. 1
FIG. 2
FIG. 3

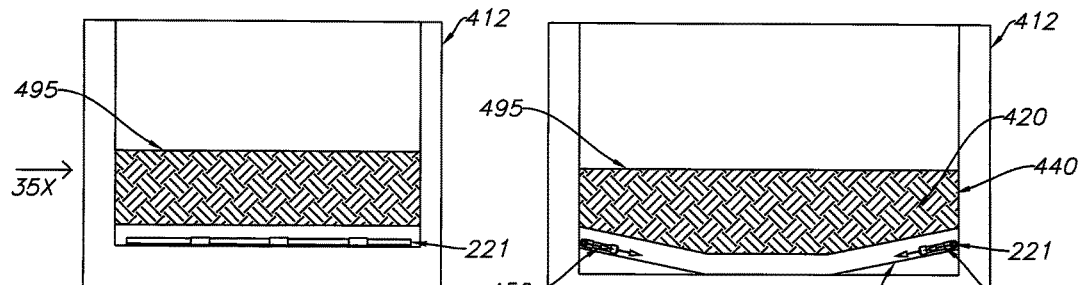
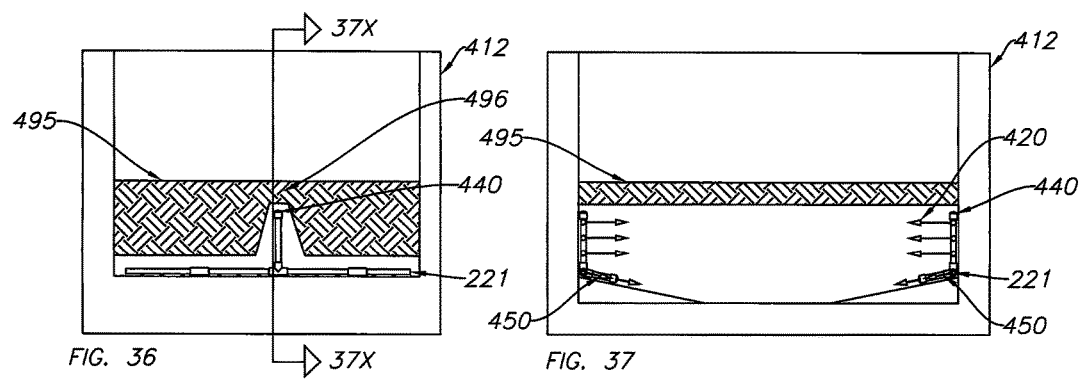
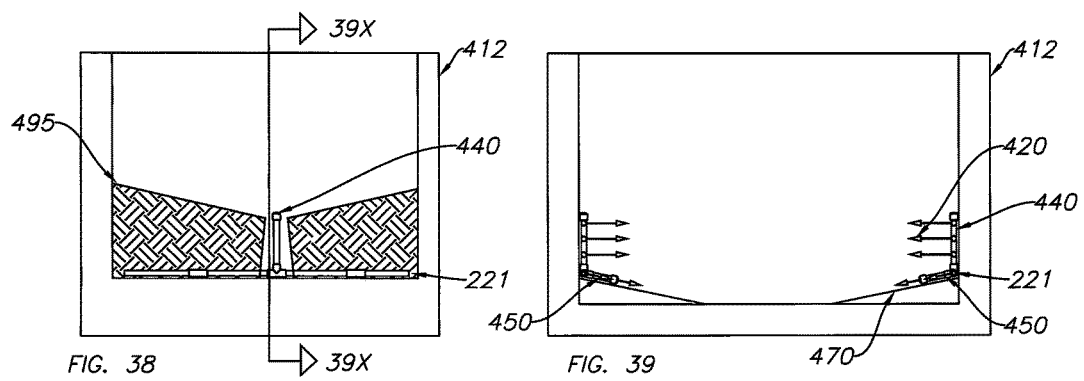

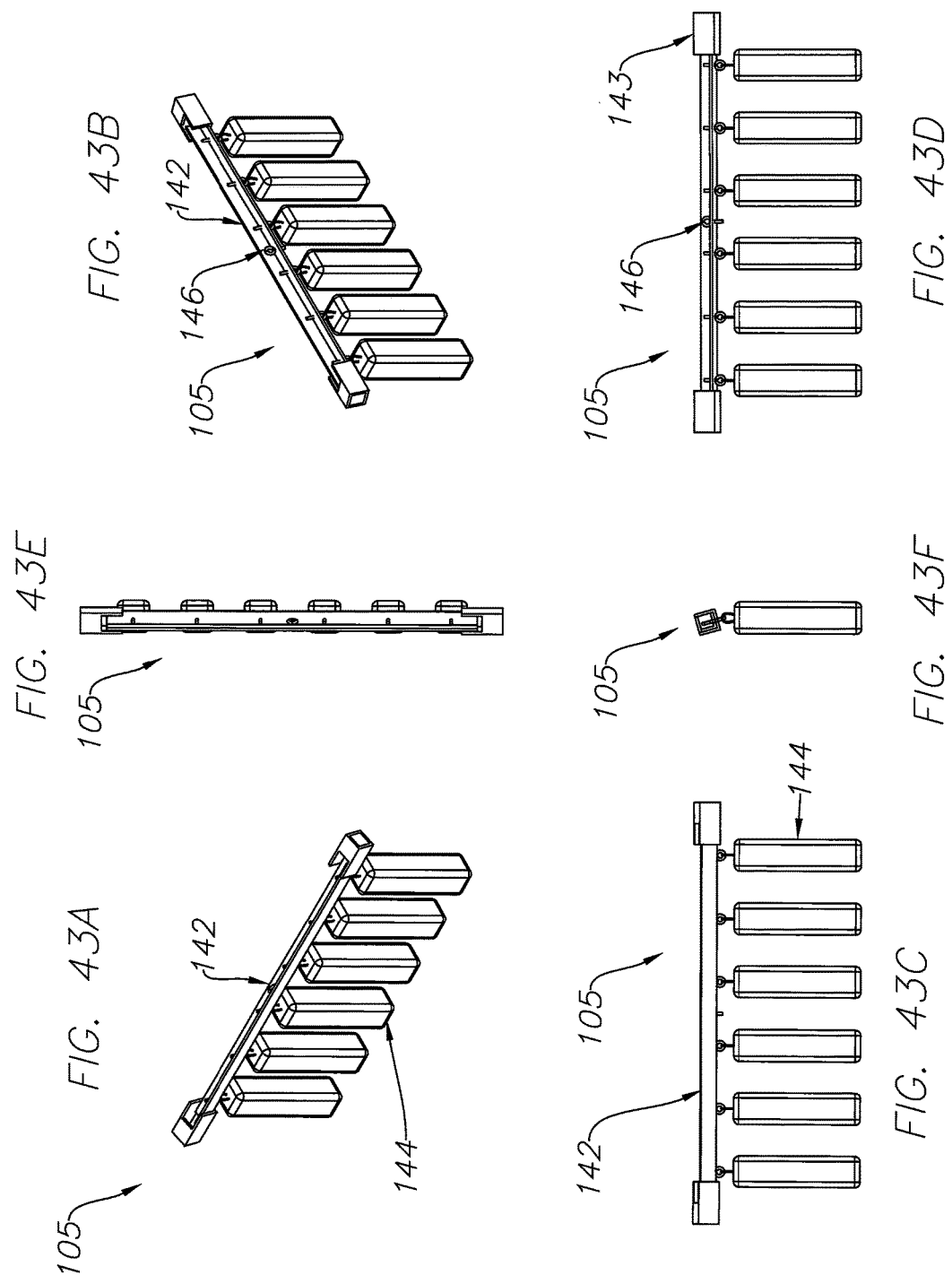

STORMWATER POLYMER TREATMENT SYSTEM

CROSS REFERENCE TO RELATED APPLICATIONS

This application is a Continuation In Part of U.S. patent Ser. No. 15/658,864 filed Jul. 25, 2017, which is a Continuation In Part of U.S. patent application Ser. No. 15/639,685 filed Jun. 30, 2017, which claims the benefit of priority to U.S. Provisional Patent Application Ser. No. 62/506,188 filed May 15, 2017, and this application is a Continuation In Part of U.S. patent application Ser. No. 14/288,455 filed May 28, 2014, which claims the benefit of priority to U.S. Provisional Application Ser. No. 61/828,958 filed May 30, 2013. The entire disclosure of each of the applications listed in this paragraph are incorporated herein by specific reference thereto.

FIELD OF INVENTION

This invention relates to treating storm water runoff, and in particular to vaults, boxes, systems, and methods to capture pollutants from stormwater runoff and prevent conveyance of the pollutants from entering a receiving water body or landscape area, that can be part of a permanent stormwater drainage infrastructure, where one or more polymer logs are applied to stormwater runoff from stormwater conveyances, such as a pipe, box culvert, ditchline, so that stormwater dosed with polymers retain pollutants, and the polymer logs continue to enhance water quality, while providing for easy servicing without requiring technicians to enter the vaults/boxes/systems, and can be used with a hydroslide system to remove debris in the bottom of the vaults/boxes/systems.

BACKGROUND AND PRIOR ART

Since the passage of the Clean Water Act in 1972 the federal government through the Environmental Protection Agency (EPA) has mandated progressively tighter controls over the quantities of pollutants and contaminants that are allowed to be released into our nation's waters. These progressively tighter mandates also encompass control of peak flows and/or volumes and the rate at which they can be discharged into existing water ways or drainage infrastructures. These resulting mandates and controls have given birth to new programs and procedures collectively referred to as storm water management.

Devices, systems and procedures that remove or reduce the pollutants and contaminates and/or control peak flows and volumes are often referred to as best management practices (BMPs). The BMPs can utilize natural, artificial or man-made techniques, and even combinations of either and/or both. Some examples of these BMPs include trash filters, sedimentation basins, retention and detention ponds, wetlands, infiltration trenches, grass swales, various types of media filters, and various types of natural filter systems including sand filters, and aggregate filters including natural and artificial wetlands.

BMPs typically use one or more mechanisms to remove the pollutants and contaminates. These mechanisms include sedimentation, filtration, absorption, adsorption, flocculation, stripping, leaching, bioremediation, and chemical processes including oxidation reduction, ion exchange, and precipitation.

Furthermore, storm water treatment systems can also be classified in relationship to the treatment level in which they are being used. In this respect, the term treatment is generally used to describe the unit processes that are used to reduce the quantities of pollutants and containments in storm water runoff.

For example, basic or pre-treatment typically refers to the removal of gross solids, sediments and larger debris through the processes of settling and screening. Enhanced or advanced treatment typically refers to processes or reducing targeted pollutants.

Filtration is a common form of enhanced treatment for storm water. Filtration utilizes a combination of physical, chemical, and biological processes. Types of filtration greatly vary dependent on the media use. Medias can be both inert and/or sorbent and are also strongly linked to natural biological processes that thrive in and/or around the media environment. Advanced filtration techniques especially include chemical and biological processes and generally include, but are not limited to processes that bring storm water in contact with plants including both macrophytes and microphytes. And the plants are both visible and invisible to the naked eye.

The reduction of nutrients that are conveyed via storm water runoff are in the forefront of the various pollutants of concern. For example; the EPA has mandated that the state of Florida reduce the overall pollutant discharge of the state by approximately ⅓. To this end the EPA has established a numeric nutrient criteria for all water bodies of the state for total phosphorus (TP) and total nitrogen (TN). These nutrient numeric values cannot be exceeded within these water bodies of the state. The result of exceeding these numeric values will result with the state of Florida being fined by the EPA.

Common pollutants typically found in storm water flow can include sediment, foliage, litter, nutrients, metals, hydrocarbons, and bacteria. Because pollutants vary significantly in their respective physical characteristics, a variety of techniques are applied to better address difficulties with capturing the pollutants. For example; capturing hydrocarbons, which are typically in a liquid state, require a different technique than capturing litter which are in a solid state.

Physical filtration whether by means of filtration media or a screen can be an effective technique for capturing solids. Contained within and attached to the solids is a wide spectrum of pollutants of concern that can range from nutrients, to litter, to bacteria. A difficulty with physical filtration is that the collected solids can become so numerous that the rate of filtration is slowed to an ineffective flow rate. Servicing of the filtration media is typically required, and the servicing often requires the media to be replaced as a part of servicing.

While media filtration of stormwater can be effective for pollution removal, long contact time with the media is required. Essentially, the rate of treatment for media is very slow and requires a lot of time to achieve significant removal efficiencies. The flow rates for stormwater are commonly very high and typically exceed the capabilities of media filtration. Using smaller particles of media will enhance the effectiveness of the media, however, smaller particles are problematic because they tend to clog easily and quickly. Clogged media filter will often flow no water and will require servicing before function is restored. The frequency required for servicing fine granular media, and the costs associated with servicing makes using fine granular media impractical.

Applying polymers to stormwater flow is a type of stormwater treatment that can be adapted to high flows. Polymers applied to water purification techniques have been use for over 75 years. Common applications for polymers include drinking water purification, erosion control, sanitary sewer processing, dredging, lake water quality enhancement, and more.

Polymers generally work in the following way: Solids that are sufficiently small to not settle easily have a tendency to maintain suspension in the water column. These solids typically have a negative charge which enables them to repel from each other, and they are kept in motion by the phenomenon known as Brownian motion. Brownian motion maintains the suspension of these particles in the water column, relatively equally diffused throughout the water. These particles often carry a wide spectrum of pollutants of concern.

Polymers act on these tiny particles to neutralize their charge. Once the charge on these particles have been neutralized, random motion of the water will direct the particles to bump into each other and cohesion will coagulate these small particles to form larger particles. As the particles increase in size the diffusion energy that previously enabled Brownian motion becomes insufficient to maintain suspension of these particles in the water column.

As a result, these larger particles will settle out of the water column and prevented from being transported to a receiving body of water. In addition, an unused portion of the polymer application will find its way into the receiving downstream water body where it will act to enhance the water quality there.

Problems exist with using polymers for stormwater applications. If the stormwater is overdosed with polymers the water can become toxic and affect a receiving body of water in a negative way. Overdosing is a concern when applying liquid polymers. Liquid polymers require significant human oversight to avoid overdosing a stormwater flow which adds significant costs to liquid applications of polymers. To overcome the need for human oversight of polymer dosing, polymers have been engineered into solid logs that dissolve in flowing water.

These polymer logs will not dissolve unless water is flowing across the surface of the logs. These surfaces of the polymer logs erode from the water flow, and as the logs continue to erode polymers are released into the water flow. Dosing concentration is a factor of water flow rate and the number of logs engaged. The problem with polymer logs is that they can become covered by solids and blinded so that the water flow does not erode the surfaces of the log. Grass and leaves are especially likely to quickly blind a polymer log, and most stormwater drain pipes commonly convey large quantities of grass and leaves.

Another problem with managing polymer logs is servicing and replacing the polymer logs as they erode away over time. A critical element for any stormwater treatment system is being able to service the system quickly and easily. The longer it takes to service a stormwater treatment system, the more money it will cost for both manpower and service equipment.

In addition, there is an element of servicing that is centered around the safety of the service technicians. For a service technician to enter a stormwater treatment vault, OSHA requires the service technicians to adhere to protocol referred to as the confined space protocol. The protocol requires the service technician that enters the vault to be equipped with a significant amount of specialized equipment. The confined space protocol also requires more personnel to be involved in the process, and a detailed report that a confined space entry took place must be submitted to an administrator. If the service technicians can complete the servicing without having to enter the vault, the additional manpower and time spent can be avoided. It is important to be able to service and/or replace the polymer logs quickly and easily without requiring a service technician to enter the confined space of a vault.

Another problem to overcome when using polymer logs is that they can dry out when exposed to the air between rain events. When the logs dry out they can develop a hard crust that is resistant to eroding when water is flowing. A polymer log that has a hard crust must be replaced. Polymer logs last longer and function better when permanently submerged in water.

Another problem is the need to remove the gross solids that are retained in a stormwater treatment system. Gross solids that are common in stormwater flow are sediments, foliage, and litter. Once the stormwater flow has been polymerized the amount of solids retained in the treatment vault will increase. Being able to quickly and easily remove gross solids from a stormwater treatment system, without having to send a technician into a confined space, will save money and conserve labor.

Thus, the need exists for solutions to the above problems with the prior art.

SUMMARY OF THE INVENTION

A primary objective of the present invention is to provide vaults, boxes, systems, and methods of treatment systems to capture pollutants from storm water runoff and prevent the conveyance of these pollutants from entering a receiving water body or landscape area, which is designed to be a part of a local permanent storm water treatment infrastructure.

A secondary objective of the present invention is to provide vaults, boxes, systems, and methods of treatment systems to capture pollutants from storm water runoff and prevent the conveyance of these pollutants, where the system enable the settling of larger solids in a lower settling chamber, capture floatables such as foliage and litter in an upper screen system, and dose the water flow with one or more polymer logs at a location adjacent to the water flow entering the vault.

A third objective of the present invention is to provide vaults, boxes, systems, and methods of treatment systems to capture pollutants from storm water runoff and prevent the conveyance of these pollutants from entering a receiving water body or landscape area, which offers an easy and inexpensive method for servicing polymer logs, without having a technician enter the vault.

An embodiment can include an upper screen system to shield one or more polymer logs from large gross solids such as leaves. The position of the polymer logs adjacent to the inflow of the vault will enable maximum mixing of water with polymer.

Large lids on top of the screen system will allow service technicians to remove the captured gross solids from the screen system. Doors on the bottom of the screen system will enable the service technician to have access to lower settling chambers.

A specialized spray system along the floor of the invention will assist with the removal of solids in the lower settling chamber.

The polymer logs can be attached to a removable beam adjacent to the inflow. The polymer beam can be removed from the vault using a reach tool by a technician from outside the vault. Once the polymer beam is out of the vault the polymer logs can be serviced as needed, and then place back inside the vault using the same reach tool.

The invention includes a treatment vault that can comprise:

a) Settling chambers for solids having a specific gravity heavier than water to settle in a lower zone below the flow line between the inflow and the outflow openings.

b) A screen system orientated to capture floatables such as foliage and litter as the water flow enters the treatment system.

c) One or more polymer logs located adjacent to the inflow of the treatment system, below the flow line between the inflow and the outflow openings, and below the screen system so that the screen system can shield the polymer logs from floatables.

d) The polymer log(s) will be attached along a beam that can be easily removed using a reach tool. The reach tool will enable a service technician to remove the polymer log beam from the treatment vault where the polymers can be service as needed at a location outside the vault.

e) An inflow gap between the bottom of the screen system and the wall from which water enters the vault. This gap serves as a bypass opening for water flow if the screen system becomes blinded with floatables.

f) A flow deflector under the inflow gap of the screen system so that water that passes through this inflow gap will be directed horizontally toward the toward the polymer logs.

g) A spray service system will be positioned along the floor of the treatment vault so that debris that settles within the lower settling chamber or chambers can be more easily serviced.

Further objects and advantages of this invention will be apparent from the following detailed description of the presently preferred embodiments which are illustrated schematically in the accompanying drawings.

BRIEF DESCRIPTION OF THE FIGURES

First Embodiment Stormwater Polymer Treatment System

FIG. 1 is a top view of the stormwater polymer treatment system with sloped floors.

FIG. 2 is an inflow view of the stormwater polymer treatment system of FIG. 1 along arrow 2X

FIG. 3 is a side cross-sectional view of the stormwater polymer treatment system of FIG. 1 along arrows 3X with arrows showing water flow directions.

Second Embodiment Stormwater Polymer Treatment System with Hydroslide System

Figure 4:
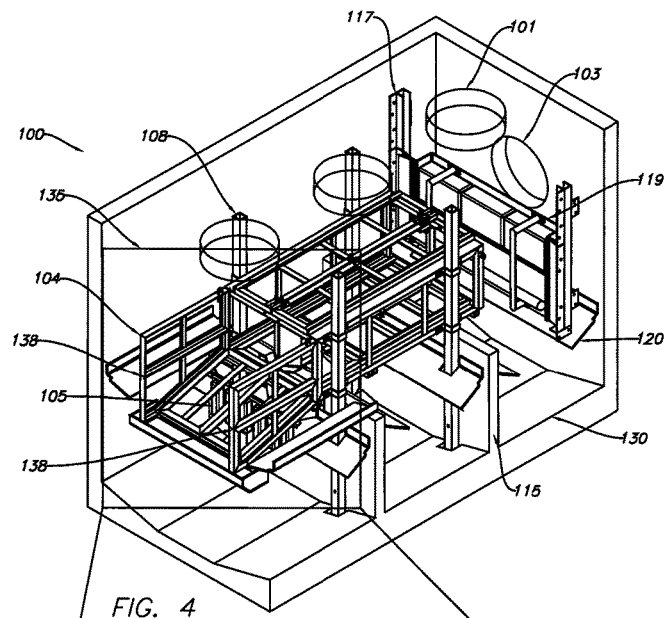
FIG. 4 is an upper perspective front side inflow view of stormwater polymer treatment system of FIG. 1.
Figure 28:
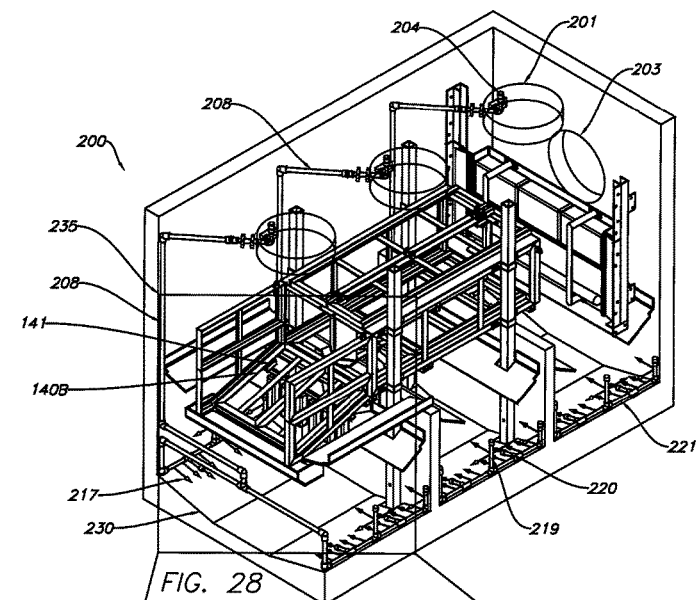

FIG. 28 is an upper perspective front side inflow view of stormwater polymer treatment system of FIG. 4 with the hydroslide system.

Figure 29:
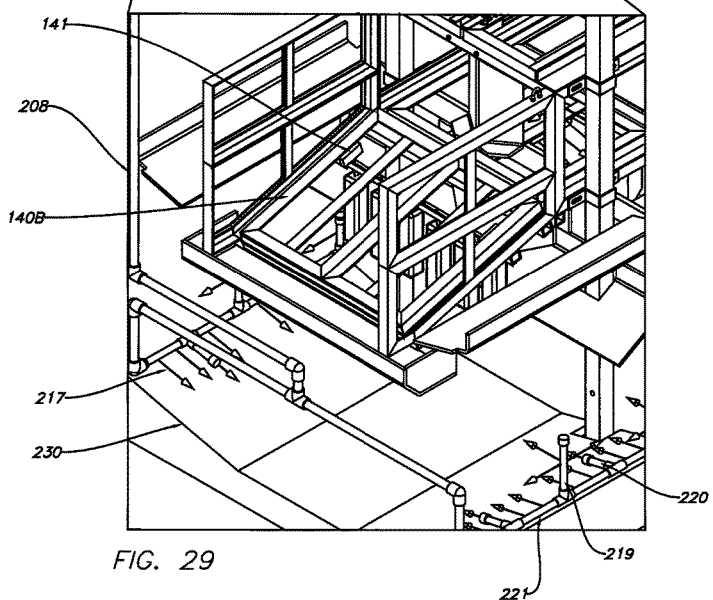

FIG. 29 is an enlarged view of the hydroslide system of FIG. 28.

Figure 30:
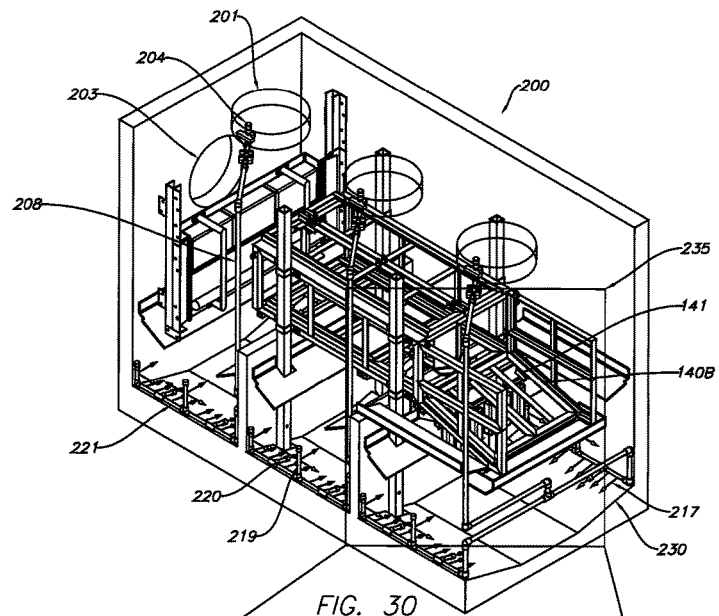

FIG. 30 is an upper perspective rear side inflow view of the stormwater polymer treatment system of FIG. 28 with the hydroslide system.

Figure 31:
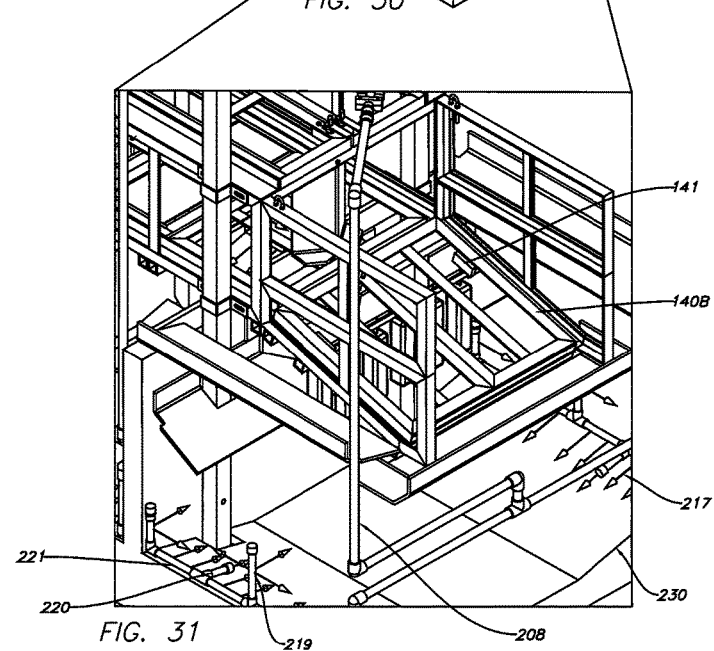

FIG. 31 is an enlarged view of the hydroslide system of FIG. 30.

Aiming Lever Detail

Figure 32:
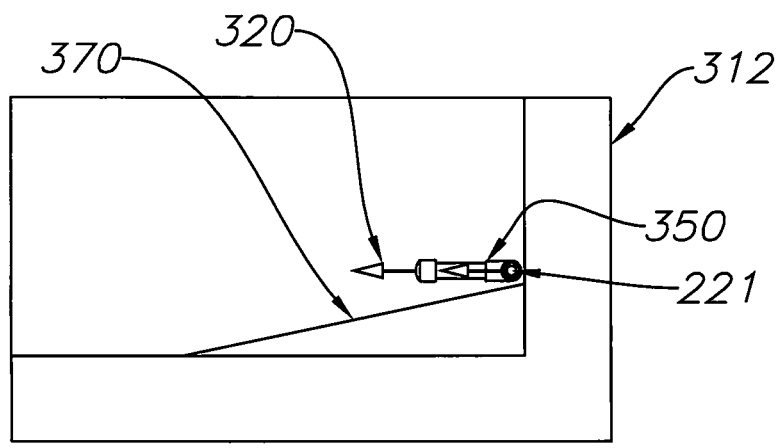

FIG. 32 is an enlarged partial side view of the aiming lever with spray bar shown in FIGS. 28-31 used to assist the spray bars along corners of the floor.

Figure 33:
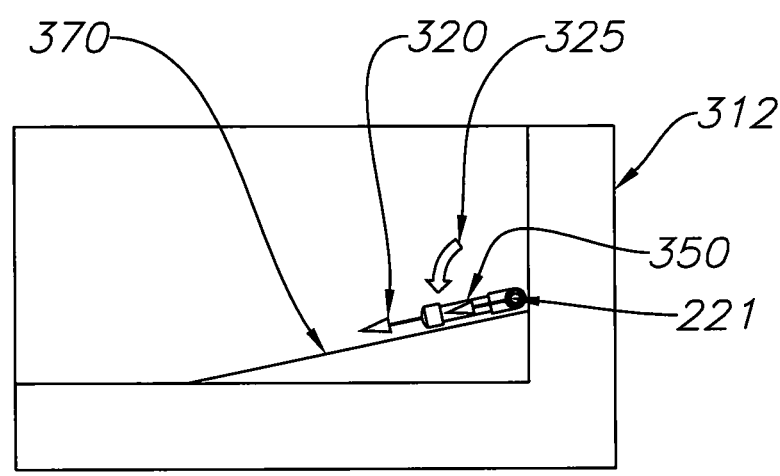

FIG. 33 is another view of the lever and spray bar of FIG. 32 rotated down so the spray direction is parallel with the sloped floor.

Knife Cutting Detail

FIG. 34 is a front side view of the treatment system of the preceding FIGURES along the floor showing the sediment debris forming a bridge in the system.

FIG. 35 is an end view of the system of FIG. 34 of the sediment debris bridge above the sloped floor with the lever and spray bars rotated down so the spray direction is parallel with the sloped floor.

FIG. 36 is another view of FIG. 34 with a vertical spray knife perpendicular to the floor spray bars spraying into the bridged sediment/debris creating a channel and a reduced bridge section location above the channel.

FIG. 37 is a cross-sectional view of FIG. 36 along arrows 37X.

FIG. 38 is another view of FIG. 36 after the weakened section location above the channel breaks away allowing the sediment/debris to fall to the lower spray bars.

FIG. 39 is a cross-sectional view of FIG. 38 along arrows 39X.

Figure 40:
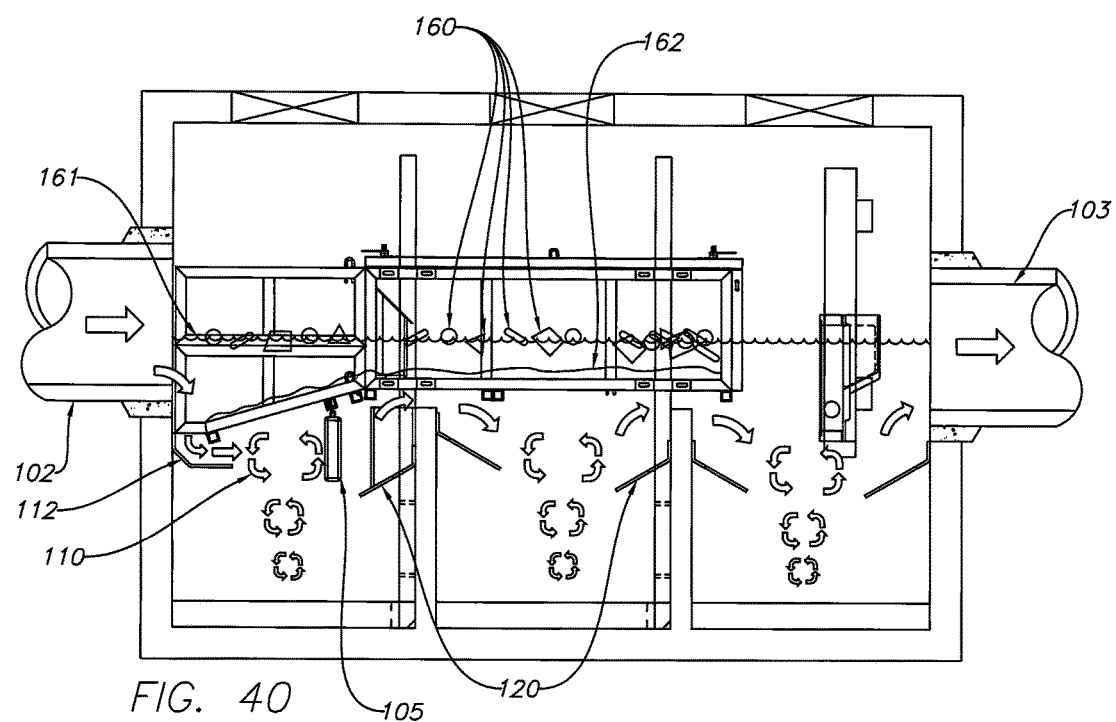

FIG. 40 is another front side view of the system of FIG. 3 showing floatables entering the screen system, debris inside the screen system and water flowing down through the inflow gap and hitting the inflow gap deflector.

Figure 41:
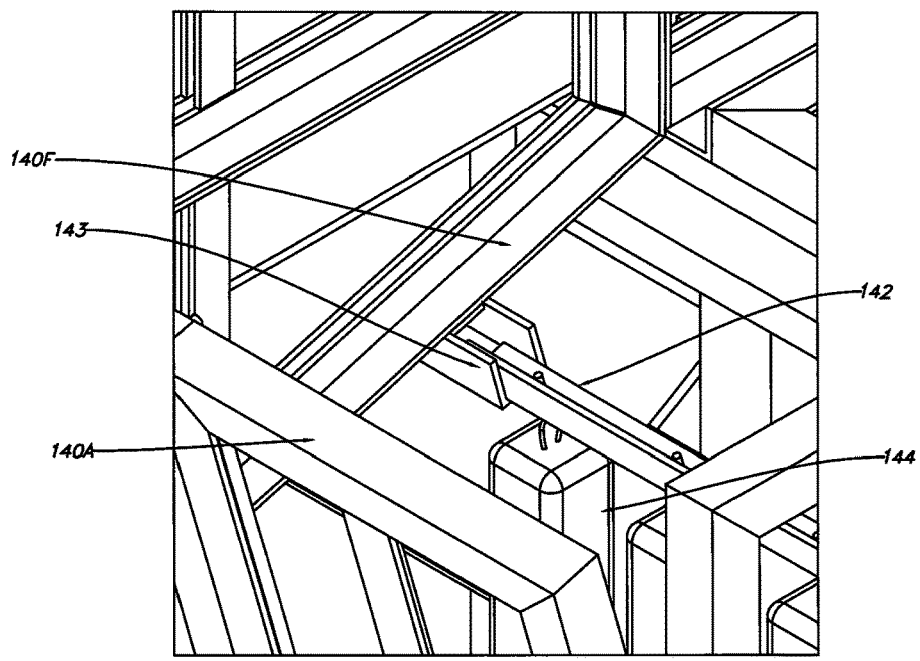

FIG. 41 is an enlarged view of the screen system of FIG. 40 with the polymer system installed with screen door open.

Figure 42:
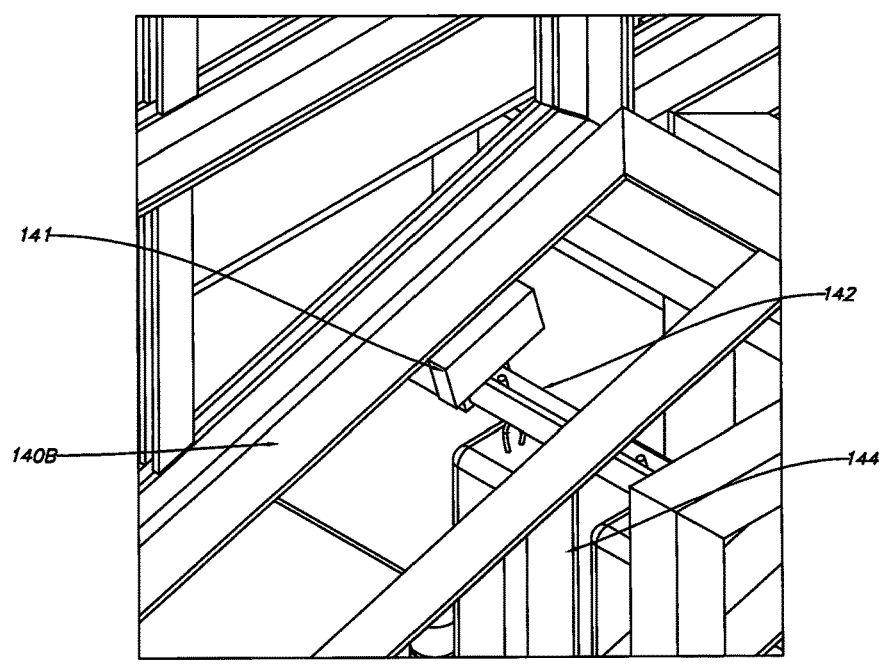

FIG. 42 is another enlarged view of the screen system of FIG. 41 with screen door closed holding down the polymer rail.

FIG. 43A is an upper front perspective view of the polymer system that includes the polymer logs supported by the polymer rail.

FIG. 43B is an upper rear perspective view of the polymer system of FIG. 43A.

FIG. 43C is a front side view of the polymer system of FIG. 43A.

FIG. 43D is a rear side view of the polymer system of FIG. 43G.

FIG. 43E is a top view of the polymer system of FIGS. 43A-43D.

FIG. 43F is an end view of the polymer system of FIGS. 43A-43E.

Figure 44A:
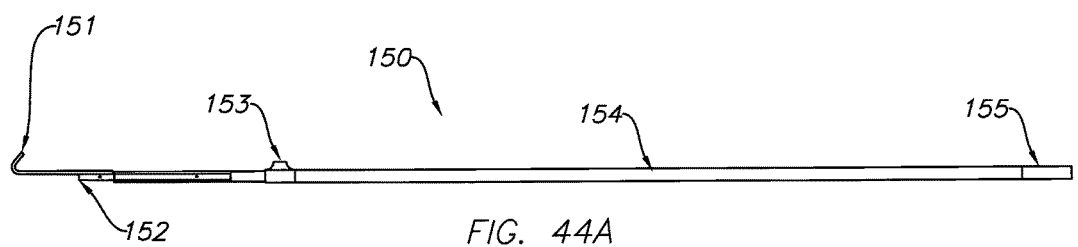

FIG. 44A is a front side view of the servicing tool used to service, remove and install the polymer system of the preceding FIGURES.

Figure 44B:
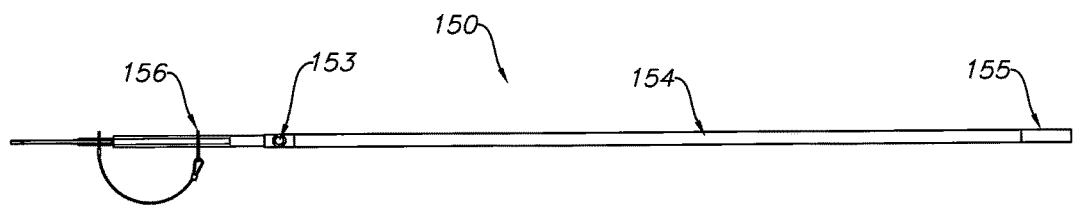

FIG. 44B is a top view of the servicing tool of FIG. 44A.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

A list of components will now be described.
100 Stormwater polymer treatment box/vault/system
101—access point
102—inflow
103—outflow
104—screen system
105—polymer (treatment) system
108—screen legs
110—flow direction arrows
112—gap deflector
115—baffle
117—skimmer track
119—skim boss
120—deflectors
130—sloped floor(s)
135—enlarged (detail) view
138—right/left leading panel(s)
140A—open screen door
140B—closed screen door
140F—Frame on both sides of door 140A/140B
140H—loop on screen door
141—polymer rail hold down
142—polymer rail
143—polymer rail insert
144—polymer log(s)
145—directional install arrow
146—servicing hook on
150—service tool
151—servicing hook
152—hook attachment
153—extension button
154—extension rod
155—extension handle
156—hook attachment lock
160—floatables
162—water level
162—debris in bottom of screen
200 box/vault/system with hydroslide system
201—access point
202—inflow
203—outflow
204—water connection
208—water line
217—spray direction arrow
219—spray knife
220—aiming lever
221—spray bar along the floor corners
230—sloped floor(s)
235—enlarged (detail) view
312—vault wall
320—spray direction arrow
325—rotational direction arrow
350—aiming lever
370—sloped floor(s)
412—vault wall
420—spray direction arrow
440—spray knife
450—aiming lever
495—sediment debris/bridge
496 weakened location First Embodiment Stormwater Polymer Treatment System FIG. 1 is a top view of the stormwater polymer treatment system 100. FIG. 2 is an inflow view of the stormwater polymer treatment system 100 of FIG. 1 along arrow 2X showing sloped floors 130. FIG. 3 is a side cross-sectional view of the stormwater polymer treatment system 100 of FIG. 1 along arrows 3X with arrows 110 showing water flow directions.

Figure 5:
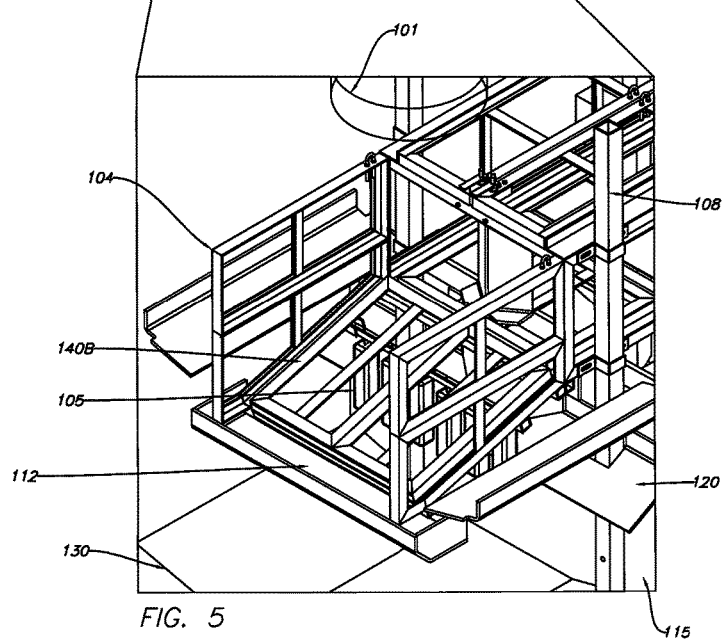
FIG. 5 is an enlarged view of the screen system of FIG. 4.

FIG. 4 is an upper perspective front side inflow view of stormwater polymer treatment system 100 of FIG. 1. FIG. 5 is an enlarged view 135 of the screen system 104 of FIG. 4.

Figure 6:
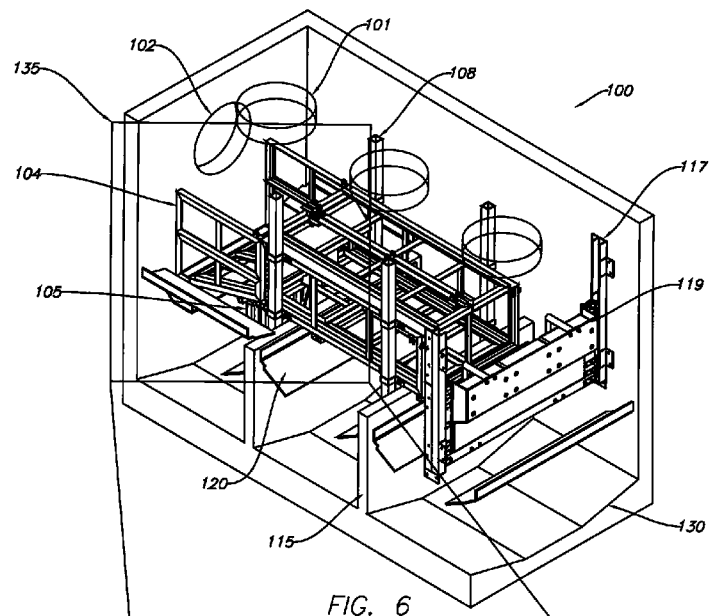
FIG. 6 is an upper perspective front side outflow view of the stormwater polymer treatment system of FIG. 1.
Figure 7:
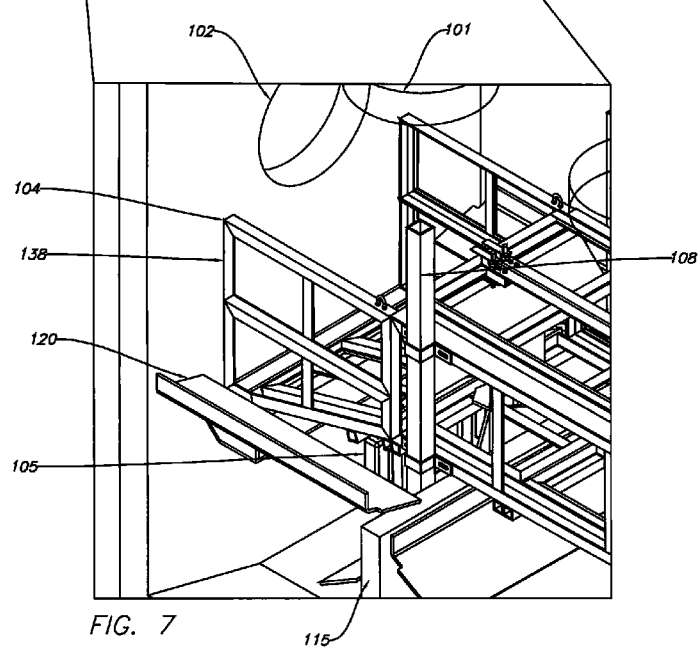
FIG. 7 is an enlarged view of the screen system of FIG. 6

FIG. 6 is an upper perspective front side outflow view of the stormwater polymer treatment system 100 of FIG. 1. FIG. 7 is an enlarged view 135 of the screen system 104 of FIG. 6

Figure 8:
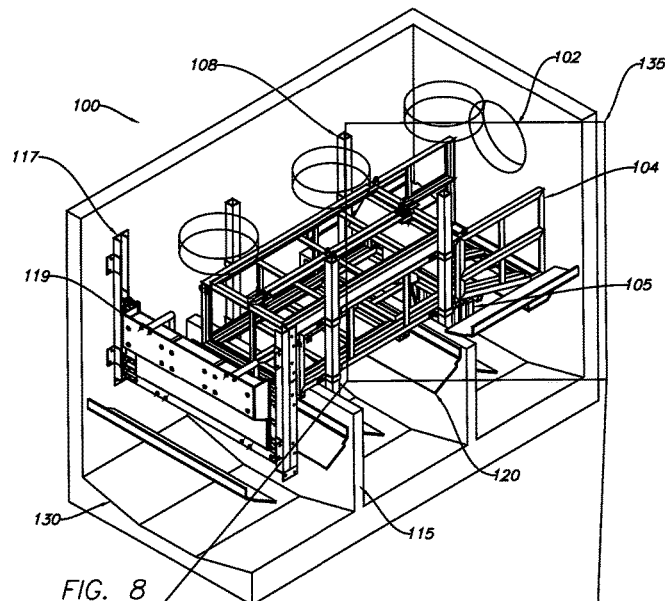
FIG. 8 is an upper perspective rear side outflow view of the stormwater polymer treatment system of FIG. 1.
Figure 9:
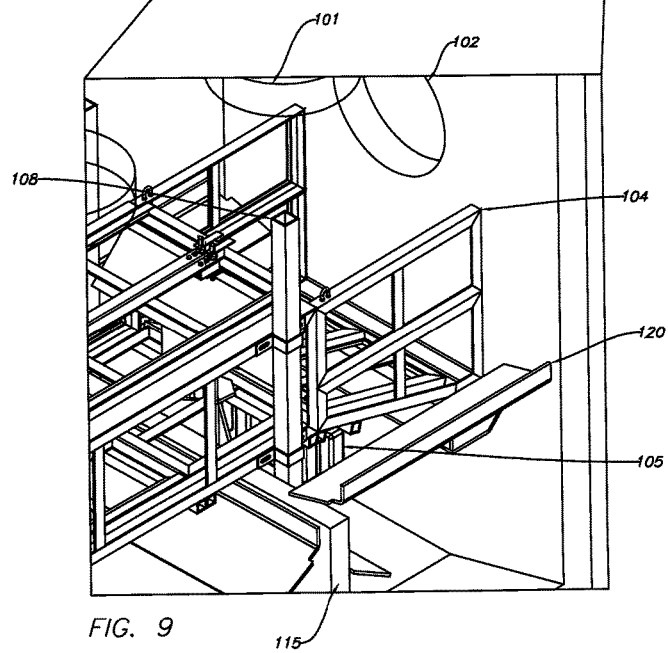
FIG. 9 is an enlarged view of the screen system of FIG. 8.

FIG. 8 is an upper perspective rear side outflow view of the stormwater polymer treatment system 100 of FIG. 1. FIG. 9 is an enlarged view 135 of the screen system 104 of FIG. 8.

Figure 10:
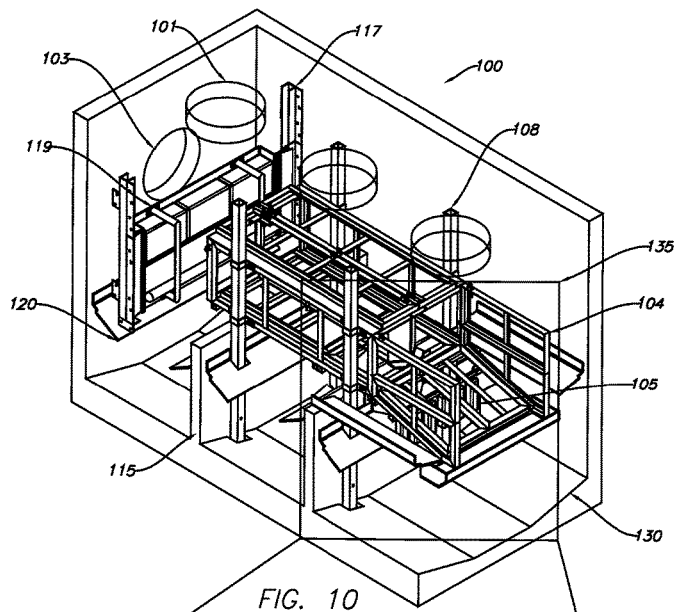
FIG. 10 is an upper perspective rear side inflow view of the stormwater polymer treatment system of FIG. 1.
Figure 11:
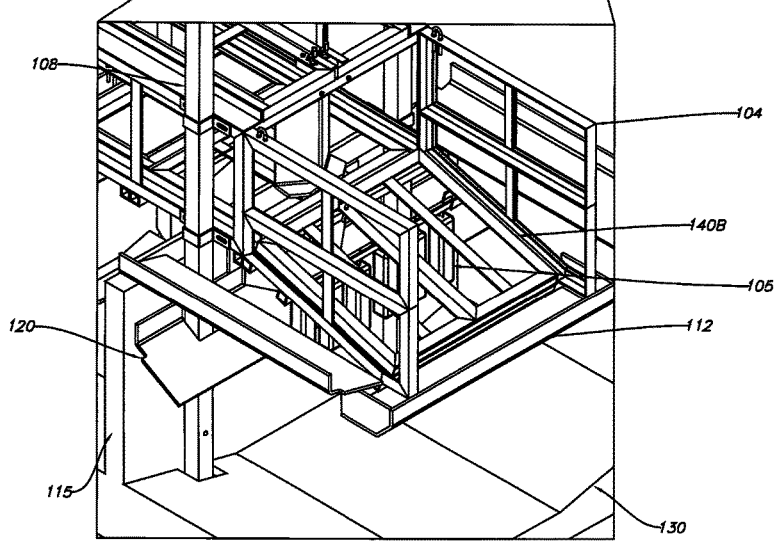
FIG. 11 is an enlarged view of the screen system of FIG. 10.

FIG. 10 is an upper perspective rear side inflow view of the stormwater polymer treatment system 100 of FIG. 1. FIG. 11 is an enlarged view 135 of the screen system 104 of FIG. 10.

Figure 12:
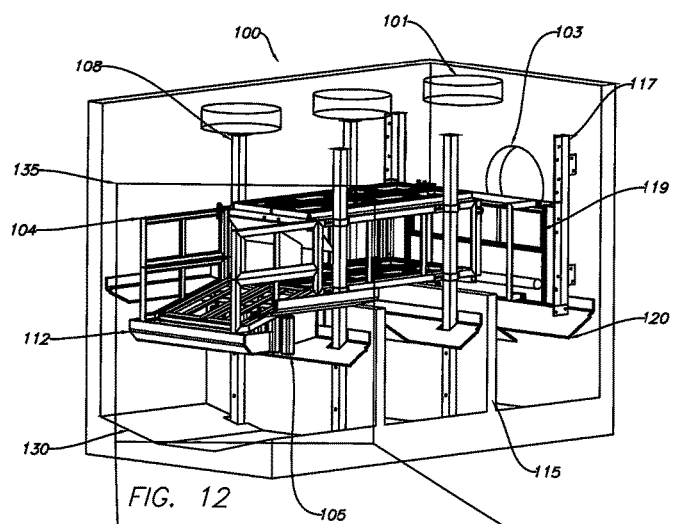
FIG. 12 is a perspective front side inflow view of the stormwater polymer treatment system of FIG. 1.
Figure 13:
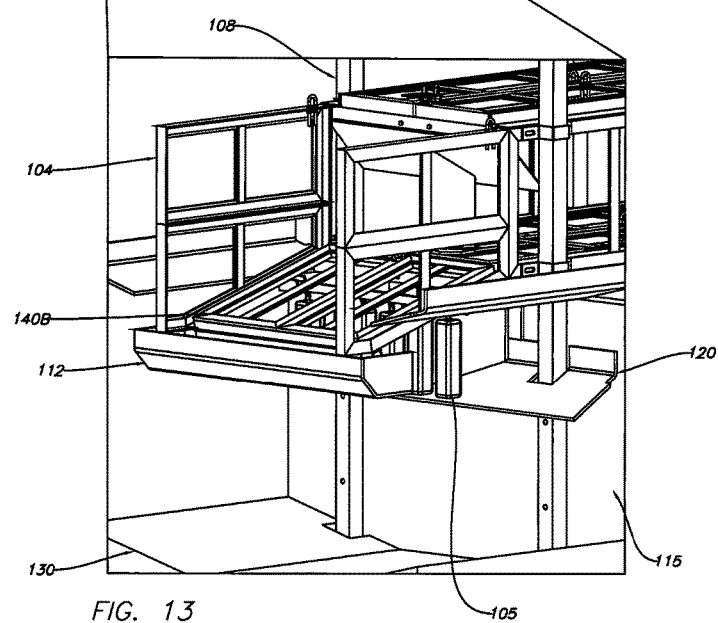
FIG. 13 is an enlarged view of the screen system of FIG. 12 showing the polymer system.

FIG. 12 is a perspective front side inflow view of the stormwater polymer treatment system 100 of FIG. 1. FIG. 13 is an enlarged view 135 of the screen system 104 of FIG. 12 showing the polymer system 105.

Figure 14:
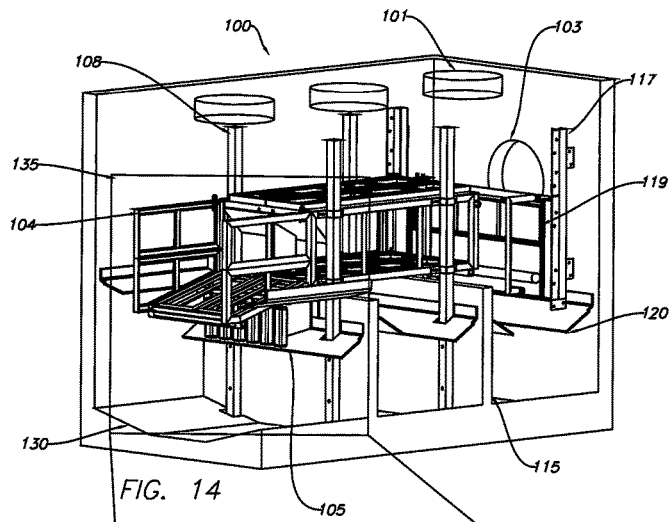
FIG. 14 is another perspective front side inflow view of the stormwater polymer treatment system of FIG. 12 with the gap deflector removed showing the polymer system.
Figure 15:
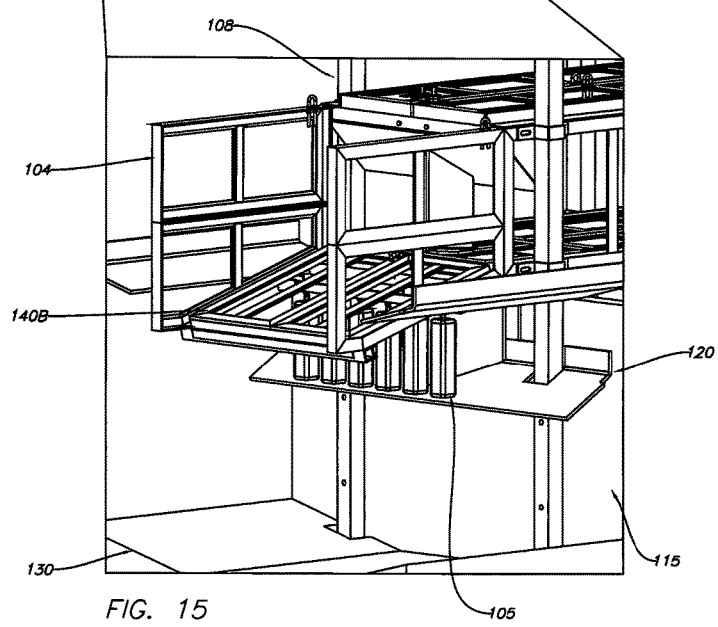
FIG. 15 is an enlarged view of the screen system of FIG. 14 showing the polymer system.

FIG. 14 is another perspective front side inflow view of the stormwater polymer treatment system 100 of FIG. 12 with the gap deflector 112 removed showing the polymer system 105. FIG. 15 is an enlarged view 135 of the screen system 104 of FIG. 14 showing the polymer system.

Figure 16:
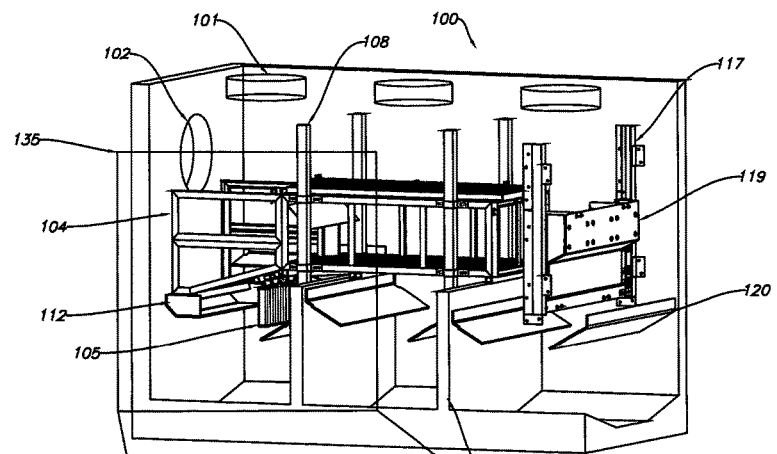
FIG. 16 is another perspective rear side outflow view of the stormwater polymer treatment system of FIG. 1.
Figure 17:
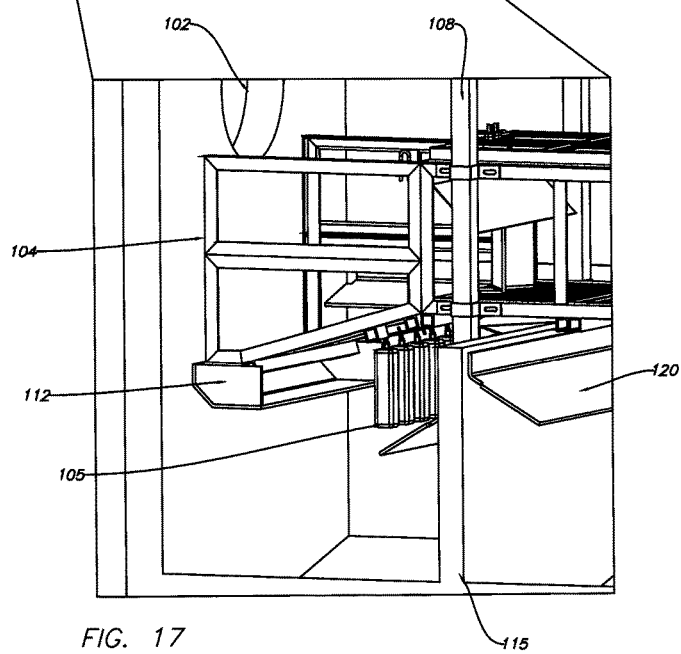
FIG. 17 is an enlarged view of the system of FIG. 16 showing the polymer logs.

FIG. 16 is another perspective rear side outflow view of the stormwater polymer treatment system 100 of FIG. 1. FIG. 17 is an enlarged view of the system 104 of FIG. 16 showing the polymer system 105.

Figure 18:
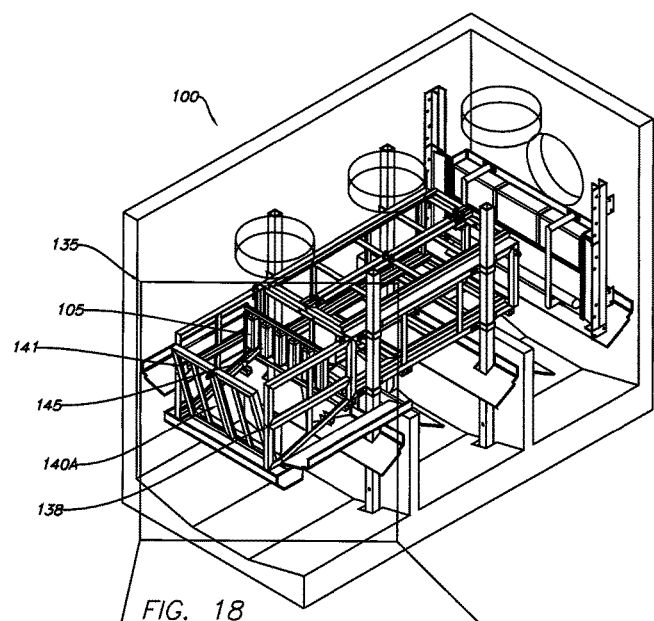
FIG. 18 is another upper perspective front side inflow view of the stormwater polymer treatment system of FIG. 1 of the polymer logs installed.
Figure 19:
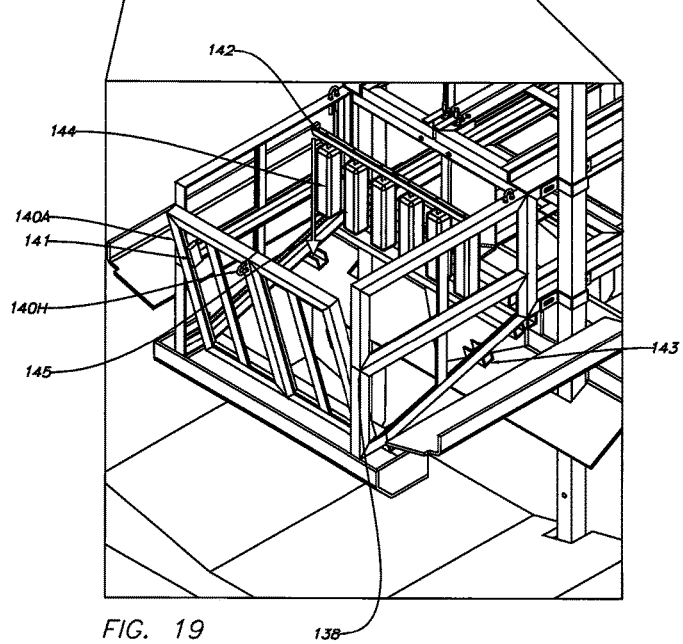
FIG. 19 is an enlarged view of the system of FIG. 18 showing the installed polymer logs.

FIG. 18 is another upper perspective front side inflow view of the stormwater polymer treatment system 100 of FIG. 1 of the polymer system 105 installed. FIG. 19 is an enlarged view of FIG. 18 showing the installed polymer system 105.

Figure 20:
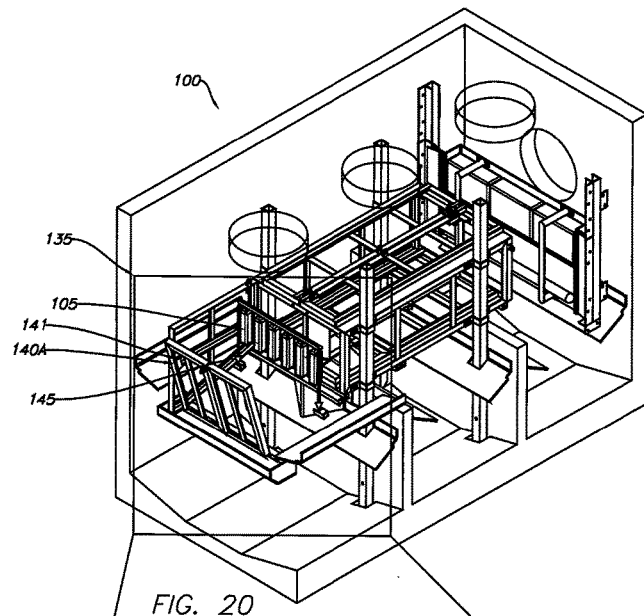
FIG. 20 is another upper perspective front side inflow view of the stormwater polymer treatment system of FIG. 18 with the right leading panels removed to show the installed polymer logs.
Figure 21:
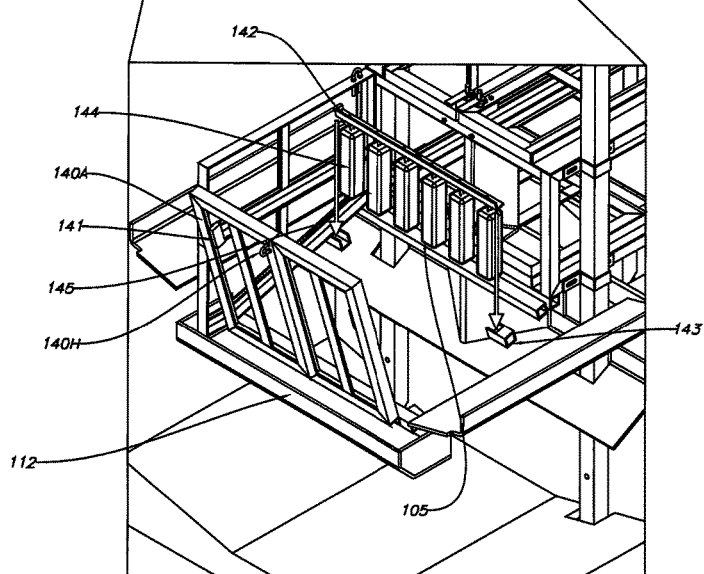
FIG. 21 is an enlarged view of FIG. 20 showing the installed polymer logs.

FIG. 20 is another upper perspective front side inflow view of the stormwater polymer treatment system 100 of FIG. 18 with the right leading panels 138 removed to show the installed polymer system 105. FIG. 21 is an enlarged view of FIG. 20 showing the installed polymer system 105.

Referring to FIGS. 1-20, the stormwater polymer treatment system 100 can be installed in a stormwater treatment chamber, vault, box, system, and the like. The treatment system 100 can include an inflow end 102, an outflow end 103 and access points 101 above the system which can allow access into the system 100 by service technicians.

Adjacent the inflow end 102, can a screen system 104 being supported by screen legs 108 over a first fixed baffle 115 that supports the screen system 104 over a sloped floor 130. The type of screened system 104 with screen legs 108 that can be used can be a screen system shown and described in U.S. Pat. No. 9,534,368, to Happel, and U.S. patent Ser. No. 15/658,864 filed Jul. 25, 2017 to Happel, which is the same inventor as in the subject patent application, which are both incorporated by reference in its' entirety.

The subject invention uses a novel closed screen door 140B that can fold up to being an open screen door 140A. The screen system can be open at the inflow end 102 and have right and left leading panels 138, with a closed screen door 140B having openings that allow for small debris to pass therethrough.

A gap can exist between a front end of the closed screen door 140B and the wall on the inflow end 102 of the screen system 104. A gap deflector 112 underneath the gap can direct water flow downward underneath the screen system 104 if the closed screen door 140B becomes clogged with large debris of floatables.

Generally, the closed door 140B of the screened system 104 will collect large floatables and allow stormwater to flow downward into a first settling chamber as shown by arrows 110 (FIG. 3) and then flow upward over the top of a first fixed baffle 115 into a second settling chamber formed between the fixed baffles 115. Side deflectors 120 on both sides of each fixed baffle 115 help direct water flow followed by a skimboss 119 and skimmer track 117 are used to further prevent debris from passing out of outflow 103.

The skimboss 119 and skimmer track 117 can be a floatable skimmer such as those shown and described in U.S. Pat. Nos. 7,846,327; 8,034,234; 8,034,236; 8,083,937; 8,231,780 and 9,534,368 to Happel, the inventor of the subject patent application, which are all incorporated by reference in their entirety.

Making use of a flow restriction barrier that increases water detention time within the treatment system can be either fixed in place, or the barrier can be designed to float upward when the hydraulic grade line (hgl) reaches an engineered and specified elevation. Greater water detention time within the treatment system will provide greater coagulation of fine solids and increased settling of these solids in the lower settling chambers.

A fixed flow restriction barrier can be sized so that water flow will top the barrier at an elevation that will not compromise the hydrology of the upstream watershed. The hydrology of the water shed will play an important role in the height of the barrier. A fixed flow restriction barrier that is topped by water flow functions as a spillway during higher flows. It is important to note that the headloss created by a spillway never goes away or reduced when water is flowing over top the spillway. When designing spillways, the engineering design must take into consideration headloss to prevent flooding upstream.

If the flow restriction barrier is designed to float upward when the hgl reaches an engineered and specified elevation, the headloss created by the flow restriction barrier can be completely nullified. Making use of a flow restriction barrier that floats will enable the flow restriction to be placed inline with a stormdrain pipe without compromising the hydrology of the water shed. In addition, as the restriction barrier floats upward the barrier functions as a skimmer which prevents floatables from passing through the vault. When the restriction barrier floats upward the water detention time will diminish as water flow bypasses between the bottom of the floating barrier and the top of the shelf that the barrier was sitting on.

However, because many times more water flow can be passed under a floating barrier than over top of a spillway, the headloss created with the restriction barrier earlier in the rain event is reduced and goes away as the hgl continues to rise. However, the heaviest concentration of pollutants within stormwater occurs in a rain event. So before the floating barrier begins to rise, the polymers will have sufficient time to enhance coagulation and settling for the most polluted portion of the rain event. In addition, most rain events will not be intense enough to raise the hgl to an elevation that will enable the flow restriction barrier to float. For example, in Tallahassee Fla., a city within the rainiest region in Florida, 44% of all rain events are less than 0.1 inches of rainfall. For all locations around the entire United States, most rain events to not yield high levels of rain fall.

Referring to FIGS. 1-20, the water flow will enter into the treatment vault/box/system 100 through an inflow opening 102 through one or more of the sides of the vault/box/chamber/system 100. Adjacent to the inflow 102 the water velocity and resulting turbulence will be significantly high. As the water flow works its way along the length of the treatment vault/box/chamber/system 100 the linear velocity of the water flow will diminish resulting in a dramatic reduction of turbulence. Although the water flow is calmed as it flows through the vault/box/chamber/system 100 toward the outflow opening 103, small eddies within the flow are still present.

A screen system 104 can be installed adjacent to the inflow 102 for the purpose of capturing floatables within the inflowing water. Adjacent to the inflow and under the screen system 102, one or more polymer logs 144 can be positioned to engage with the water turbulence as water flow enters into the treatment vault/box/chamber/system 100. The screen system 102 can engage floatables entering the vault/box/chamber/system 100 and prevent them from making physical contact with the polymer logs 144.

Water flow that engages the polymer logs 144 will become polymerized water, and the solids therein will be stripped of the ionic charge and begin to coagulate. As the water flow travels toward the outflow 103 from the vault/box/chamber/system 100, gentle mixing will occur due to the eddies in the flow. The mixing that takes within the eddies will act to accelerate the coagulation process.

If the screen system 104 becomes blinded by captured floatables, water flow will begin to pass through the inflow gap in the bottom of the screen system, adjacent to the inflow 102. Floatables such as litter and foliage will float across the inflow gap into the body of the screen system. Heavier solids such as sediments will fall through the inflow gap and settle in the settling chamber below. Directly under the inflow gap is a gap deflector 112 that can redirect the water flow passing down through the inflow gap to horizontally flow and toward the polymer logs 144. This ensures that the polymer logs 144 will be engaged with the water flow even if the screen system 104 becomes blinded by captured debris.

Settling Zone:

Generally, a pipe will convey water flow into the vault/box/chamber/system 100. The cross-sectional area of conveyance within the vault/box/chamber/system 100 can be substantially greater than that of the inflow pipe, resulting in a substantial drop in the linear velocity of the water flow as the flow enters the vault/box/chamber/system 100. When the linear velocity of the water flow is reduced the turbulence will also be reduced. The water flow will calm and the turbulence required to keep solids suspended in the water column will be dramatically reduce. The lack of turbulence inside the vault/box/chamber/system 100 can enable a major portion of the solids to settle to the bottom of the vault/box/chamber/system 100 where the solids will remain until servicing is performed. In addition, water flow entering the treatment vault/box/chamber/system 100 will engage the polymer logs stripping the ionic charges from the ultra-small solids that typically would be too small to settle. As the flow works its way through the treatment vault/box/chamber/system 100, eddies in the water flow will enable these ultra-small particles to bump into each other and coagulate into larger particles. Once enough of the ultra-small particles have coagulated into a sufficiently large particle, these larger particles will settle into the lower settling zones where they will remain captured until serving.

Polymer Logs:

Referring to FIGS. 1-20, polymer logs 144 can be positioned adjacent to the inflowing water entering the vault/box/chamber/system 100, and below the static hydraulic grade line in the first settling zone.

The polymer log(s) 144 can be generally elongated bars of polyacrylamide co-polymers in netted bags, such as but not limited to the APS 800 Series Pond Logs manufactured by Applied Polymer Systems of Woodstock, Ga.

Because the polymer logs 144 will always be within the water inside the settling zone, they will not dry out in the air and remain fully available to mix with flowing water. The zone adjacent to the inflow 102 is highly turbulent compared to the rest of the treatment vault/box/chamber/system 100.

The inflowing water turbulence will cause the polymer log(s) 144 to erode and mix with the water flow. The water flow will become what is referred to as polymerized water. The polymers within the polymerized water will act on act on tiny particles within the water to neutralize the electrical charge of the particles. Once the charge on these particles have been neutralized, random motion of the water will direct the particles to bump into each other and cohesion will coagulate these small particles to form larger particles.

As the particles increase in size the diffusion energy that previously enabled the Brownian motion of particles becomes insufficient to maintain suspension of these particles in the water column. As a result, these larger particles will settle out of the water column into the settling zone of the treatment vault/box/chamber/system 100, and prevented from escaping the treatment vault/box/chamber/system 100. In addition, the unused portion of the polymer application will find its way into the receiving downstream water body where it can act to enhance the water quality there in much the same way. When solids are removed from the water column in a pond, more sunlight is able to reach aquatic plants, and the aquatic plants in turn will aid with providing treatment of the water.

Screen System:

Referring to FIGS. 1-20, a screen system 104 can be positioned adjacent to the inflow 102 and orientated to shield the polymer log(s) 144 from large gross solids such as leaves. The position of the polymer log(s) 144 adjacent to the inflow 102 of the vault/box/chamber/system 100 can enable sufficient erosion of the polymer log(s) 144 and maximum mixing of water with the polymer.

However, preventing larger solids such as various types of foliage from sticking to the surface of the polymer log(s) 144 and blinding the logs 144 from water flow, is critical to maintaining and regulating the dosage of polymers. The screen system 104 can be above the polymer log(s) 144, and as the flow enters the treatment vault, the screen system 104 will direct floatables past the polymer log(s) 144 and into the downstream body of the screen system 104. Floatables can collect in the body of the screen system 104 where they will remain until servicing is performed. During servicing these floatables can be removed via a vacuum truck and they will be disposed of at a landfill.

In the event the screen system 104 becomes full and/or blinded with floatables, which could prevent water turbulence from engaging and eroding the polymer log(s) 144, a secondary flow path is available to engage the water flow without floatables with the polymer log(s) 144. Between the inflow conveyance 102 of the treatment vault/box/chamber/system 100 and the bottom of the screen system 104, there is a gap in the bottom of the screen system 104. This gap is referred to as the inflow gap. As water enters the vault/box/chamber/system 100, floatables can float above and past the inflow gap into the body of the screen system 104.

If the screen system 104 becomes blinded, water pressure within the screen system 104 can influence water flow downward through the inflow gap. Floatables within the water flow can remain at an elevation that is relatively high in the water and not downward through the inflow gap. Directly under the inflow gap can be a gap deflector 112 that can redirect the water flow passing down through the inflow gap to flow horizontally again and toward the polymer log(s) 144 below the screen system 104. This ensures that the polymer log(s) 144 can be engaged with the water flow even if the screen system becomes blinded by captured debris.

Large lids can be placed over or under access points 110 on top of the screen system 104, which can be opened to enable service technicians to remove the captured gross solids from the screen system 104. Doors 140A, 140B, on the bottom of the screen system 104 will enable the service technician to have access to lower settling chambers.

Operation of the Screen Door 140A/140B

Figure 22:
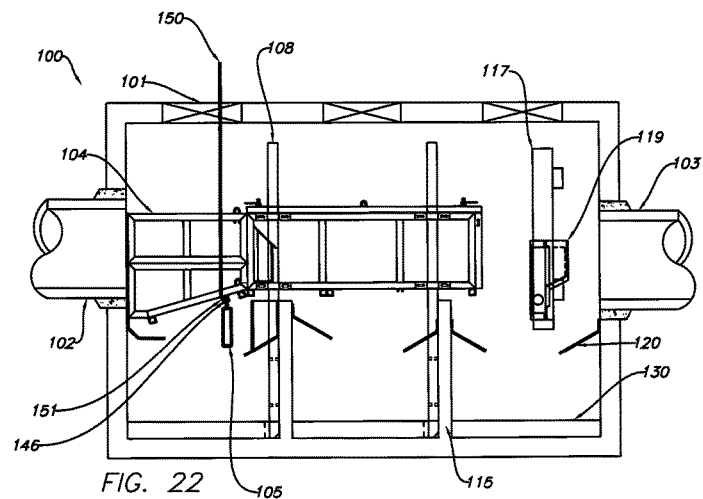
FIG. 22 is a front side view of the system of FIG. 1 showing the service tool reaching down to the polymer logs.
Figure 23:
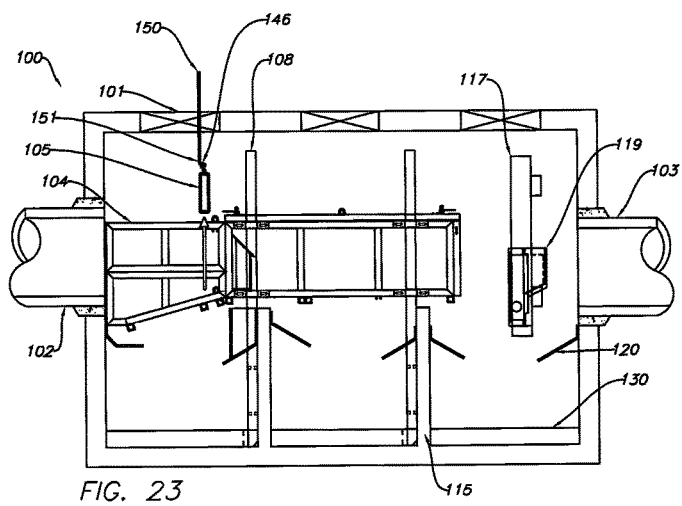
FIG. 23 is another front view of the system of FIG. 22 showing the service tool removing the polymer logs.

FIG. 22 is a front side view of the system of FIG. 1 showing the service tool 150 reaching down to the suspended polymer log(s) 144. FIG. 23 is another front view of the system of FIG. 22 showing the service tool 150 removing the polymer log(s) 144.

Figure 24:
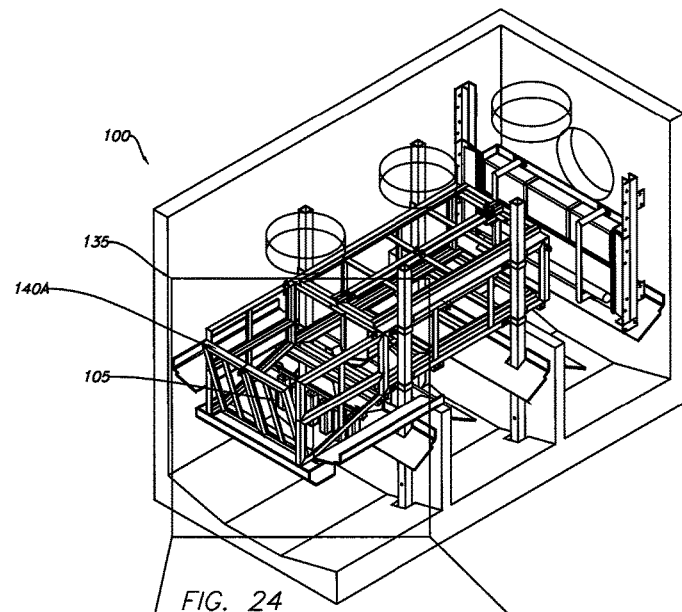
FIG. 24 is another upper perspective front side view of the system of FIG. 20 with the installed polymer logs.
Figure 25:
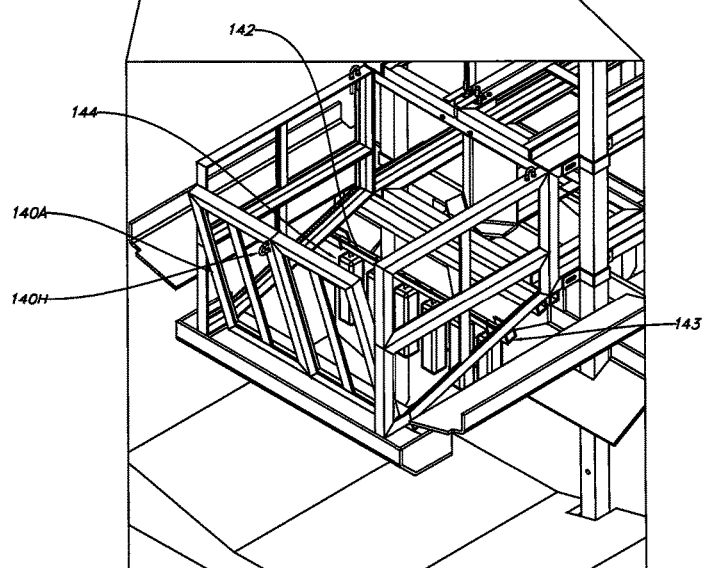
FIG. 25 is an enlarged view of the FIG. 24 showing the installed polymer system.

FIG. 24 is another upper perspective front side view of the system of FIG. 20 with the installed polymer log(s) 144. FIG. 25 is an enlarged view of the FIG. 24 showing the installed polymer log(s) 144.

Figure 26:
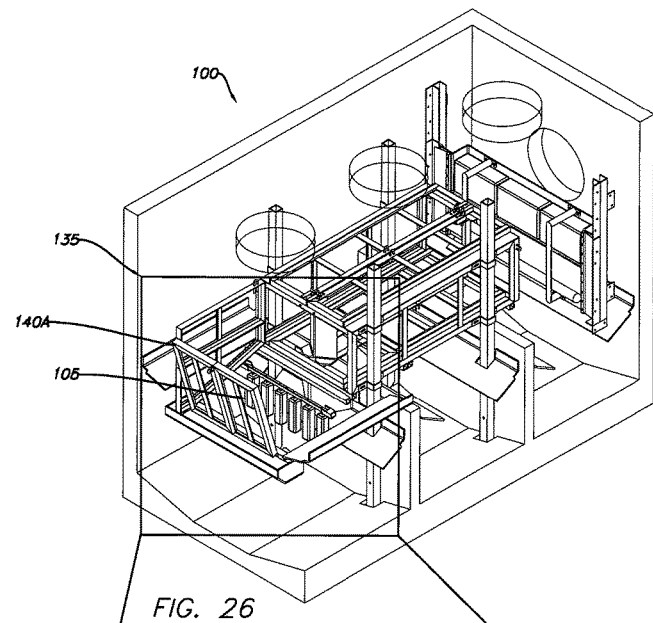
FIG. 26 is another upper perspective front side view of the system of FIG. 24 with the right leading panels removed showing the installed polymer logs.
Figure 27:
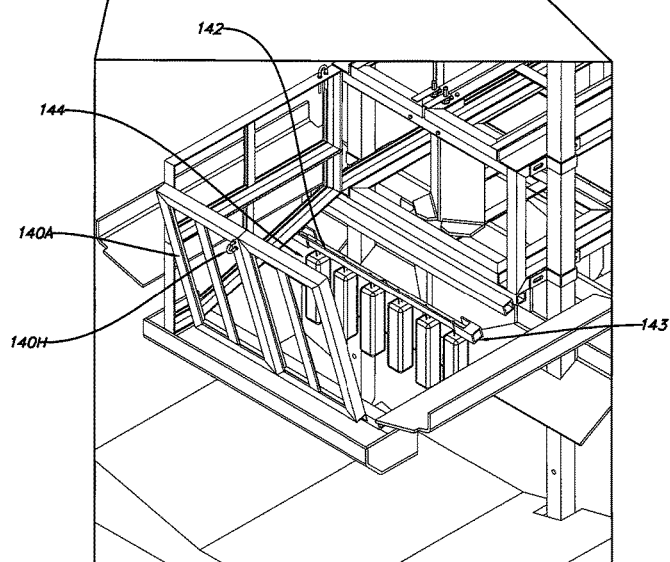
FIG. 27 is an enlarged view of FIG. 26 showing the installed polymer logs.

FIG. 26 is another upper perspective front side view of the system of FIG. 24 with the right leading panels 138 removed showing the installed polymer logs 144. FIG. 27 is an enlarged view of FIG. 26 showing the installed polymer log(s) 144.

FIG. 40 is another front side view of the system of FIG. 3 showing floatables 160 entering the screen system 104 at water level 161, debris 162 inside the screen system 104 and water flowing down through the inflow gap and hitting the inflow gap deflector.

FIG. 41 is an enlarged view of the screen system of FIG. 40 with the polymer system installed with screen door open 140A.

FIG. 42 is another enlarged view of the screen system of FIG. 41 with screen door closed 140B holding down the polymer rail 141.

FIG. 43A is an upper front perspective view of the polymer system 105 that includes the polymer log(s) 144 supported by the polymer rail 142. FIG. 43B is an upper rear perspective view of the polymer system 105 of FIG. 43A. FIG. 43C is a front side view of the polymer system 105 of FIG. 43A. FIG. 43D is a rear side view of the polymer system 105 of FIG. 43B. FIG. 43E is a top view of the polymer system 105 of FIGS. 43A-43D. FIG. 43F is an end view of the polymer system 105 of FIGS. 43A-43E.

Referring to FIGS. 43A-43F, the polymer system 104 can include a polymer rail 142 having outer ends that can fit into rail inserts 143. The rail inserts 143, can be U shaped channels that can be pre-attached to side supports of a frame 140F (shown in FIG. 41) about both sides of the screen door 140A, 140B. The top of the rail 142 can include a servicing hook on loop 146.

FIG. 44A is a front side view of the servicing tool 150 used to service, remove and install the polymer system 105 of the preceding FIGURES. FIG. 44B is a top view of the servicing tool 105 of FIG. 44A. The servicing tool 150 can be an elongated telescopic rod having an extension rod portion 154 which can have a telescopic portion that can extend when activated by an extension switch 153, such as a depressible button. A service technician can grip the tool 150 by handle end 155. The opposite end can include a hook attachment 152 by attaching a servicing hook 151 thereon.

Referring to FIGS. 10-27 and 40-44B, a service technician can access the polymer system 105 without having to enter into the chamber/vault/box/system 100. The technician can grip the handle end 155 of the service tool 150 and direct the hook end 151 to hook about the loop 140H on the closed screen door 140B. The technician can then lift the service tool 15 to raise the closed screen door 140B to an open screen door 140A position. The screen door 140A/140B can have a proximate end that is either hinged or is able to pivot when the screen door 140B is raised to an open screen door 140A position. When this bottom door is open a service technician from outside the treatment vault can reach into the vault using a reach tool 150 and access the polymer logs 144. The log(s) 144 can be attached along the length of a beam/rail 142 that spans the opening under the screened bottom door 140A/140B.

Next, the technician can angle the hook end 151 to hook about the service tool 150 onto the servicing hook-on loop 146 on the rail 142 of the polymer treatment system 105, and lift the rail 142 with polymer log(s) 144 of the polymer treatment system 105 out of the chamber/vault/box/system 100. The technician can then remove the polymer logs 144 for servicing, replacing, cleaning off and the like. Once the polymer beam has been replenished, it can be placed back into the system using the reach tool 150. The service technician does not need to enter the vault to service the polymer logs 144.

Second Embodiment Stormwater Polymer Treatment System with Hydroslide System

FIG. 28 is an upper perspective front side inflow view of stormwater polymer treatment system 100 of FIG. 4 with the hydroslide system 200. FIG. 29 is an enlarged view 235 of the hydroslide system of FIG. 28. FIG. 30 is an upper perspective rear side inflow view of the stormwater polymer treatment system of FIG. 28 with the hydroslide system 200. FIG. 31 is an enlarged view 235 of the hydroslide system 200 of FIG. 30.

Referring to FIGS. 28-31, the access point(s) 201, inflow 202 and outflow 203 and sloped floor(s) 230 in the chamber/vault/box/system are similar to those components in the preceding FIGURES.

Servicing System and Procedure:

A critical element for any stormwater treatment system is being able to service the system quickly and easily. The longer it takes to service a stormwater treatment system, the more money it will cost for both manpower and service equipment. In addition, there is an element of servicing that is centered around the safety of the service technicians. For a service technician to enter a stormwater treatment vault, OSHA requires the service technicians to adhere to protocol referred to as the confined space protocol. The protocol requires the service technician that enters the vault to be equipped with a significant amount of specialized equipment. The confined space protocol also requires more personnel to be involved in the process, and a detailed report that a confined space entry took place must be submitted to an administrator. If the service technicians can complete the servicing without having to enter the vault, the additional manpower and time spent can be avoided.

Spray Bars and Sloped Floors:

Referring to FIGS. 28-31, the system for removing debris that has settled into the lower settling zone includes a spray system and sloped floors 230. The spray system enables water to be injected into the stormwater treatment system 200 at high pressure from outside the vault. Adjacent to the access opening 201 in the top of the stormwater treatment system is an attachment fitting for a vacuum service truck to connect onto. A pipe or hose will convey high pressure water flow from the service truck to the spray system through a water connection(s) 204 and to water line(s) 208 in the lower settling chamber(s). As a part of the spray system, spray bars 221 along the floor and vertical walls of the treatment system have water nozzles along the length of the spray bar or bars 221 that are aimed parallel with the floor. These nozzles operate at high pressure and will drill into the layer of solids that have settled into the settling zone adjacent to the floor inside the vault. The layer of solids will be liquefied from the underside and flushed toward the center of the settling zone where a vacuum from a service vehicle can remove the solids from the vault. A plurality of spray knife(s) 219 and aiming lever(s) 220 can spray in the direction of arrow(s) 217 toward the center of the sloped floor 230.

The floors 230 of the system 200 can be sloped downward and away from the wall or walls of the vault. Sloping the floors 230 can enable gravity to influence the movement of water and solids toward the center of the settling zone where a vacuum will remove the solids from the vault. Both gravity and the kinetic energy of the water nozzles will direct solids toward the center of the settling zone.

Aiming Lever Detail

FIG. 32 is an enlarged partial side view of the aiming lever 350 with spray bar against the vault wall 312 shown in FIGS. 28-31 used to assist the spray bars 221 along corners of the floor. FIG. 33 is another view of the lever 350 and spray bar 221 of FIG. 32 rotated down in the direction of arrow 325 so the spray direction 320 is parallel with the sloped floor 370.

A primary objective of the HydroSlide servicing system 200 is to liquefy the sediment from underneath and thrust the debris toward the location in the settling chamber where it can be vacuumed out by a vacuum truck. This is accomplished by using water pumped into the servicing system at high pressure from equipment located outside the vault. Spray bars 221 having a series of nozzles are positioned along the floor of the settling chamber. The water exiting the spray nozzles needs to be traveling at a sufficient velocity so that it can drill into the debris that has settled into the settling chamber. It is also important the nozzles be aimed parallel with the floor of the settling chamber.

If the nozzles of floor spray bars are not aimed parallel with the floor performance deficiencies can occur. If the nozzles are aimed too far upward the water jets will miss much the debris along the floor of the settling chamber. If the nozzles are not able to engage the sediment along the floor it will not be able to thrust this debris toward the location in the settling chamber where it can be vacuumed out. If the nozzles are aimed too low the water jets will hit onto the floor of the settling chamber. When the water jets hit onto the floor the velocity of the water jets are significantly reduced and the water jets will not be able to adequately drill into the debris.

A part of the sprayer servicing system are the sloped floors 230 (FIGS. 28-31) and 370 (FIGS. 32-33) which aid in conveying debris toward the location in the settling chamber where it can be vacuumed out. A difficulty to overcome is that the angle of the sloped floors 230/370 vary significantly due to differences in designs and workmanship. The time that it takes to install the sprayer service system needs to be minimized to avoid added expenses. For example; during a typical installation of a stormwater treatment system a lot of heavy equipment and manpower is required, and the time to install treatment system can be very expensive. Having to take extra time to unsure that the nozzles of a spray bar are aimed correctly can create delays along with the extra costs associated with these delays.

Another issue of installation of the sprayer service system can be the skill level of the installation personnel. Having a feature of the service system that reduces the required skill level to install the servicing system correctly will aid with ensuring that all installs are done perfectly correct.

The aiming levers are a part of the floor spray bars and will solve the before mentioned issues. The aiming levers are parallel with the direction of the water jets along the spray bars. The aiming lever serves as physical and visual indicator that ensures that the nozzles are aimed parallel with the floor of the settling chamber. During the manufacturing of the spray bars there is a high level of quality control to ensure that the aiming levers are parallel with the nozzles along the spray bars. The technician installing the spray bars simply needs to make sure the aiming lever is pressed flat onto the floor. This can be accomplished by pushing down on the aiming lever until it hits onto the floor. Regardless of the angle of the floor, when the aiming lever is pressed down onto the floor the nozzles will be parallel with the floor. Because the process is so simple and quick, installation time and the required skill to install is minimized.

Knife Cutting Detail

FIG. 34 is a front side view of the treatment system of the preceding FIGURES along the sloped floor 470 showing the sediment debris forming a sediment/debris bridge 495 between vault wall(s) 412 in the system. FIG. 35 is an end view of the system of FIG. 34 of the sediment debris bridge 495 above the sloped floor 470 with the lever 450 and spray bars rotated down so the spray direction 420 is parallel with the sloped floor 470.

FIG. 36 is another view of FIG. 34 with a vertical spray knife 440 perpendicular to the floor spray bars spraying into the bridged sediment/debris bridge 495 creating a channel and a reduced bridge section 496 location above the channel. FIG. 37 is a cross-sectional view of FIG. 36 along arrows 37X.

FIG. 38 is another view of FIG. 36 after the weakened section location 496 above the channel breaks away allowing the sediment/debris 495 to fall to the lower spray bars. FIG. 39 is a cross-sectional view of FIG. 38 along arrows 39X.

In addition to the spray bars of the spray system are vertical pipe sections 440 that function as a kind of knife. The knife will slice a vertical cut through the layer of solids in the settling zone of the stormwater treatment system.

As debris accumulates in a settling chamber it can become highly compacted. In addition, sediment, leaves, and twigs will become integrated throughout the accumulated debris. The presence of leaves and twigs enhances the general structure of the accumulated debris.

During servicing of the lower settling chambers when the HydroSlide service system 200 is powered on, what often happens to the collected debris is the jets that are aimed along the floor of the chamber will undermine the sediment without the majority of sediment collapsing to the floor. Essentially, what has happened is the structure of the sediment has allowed the jets aimed along the floor to drill through the sediment close to the floor, while the compacted debris above the floor jets bridges between the solid walls of the vault to support the bulk of the debris above the floor jets. When debris bridging 495 occurs the floor jets are not able to engage all the debris.

The knife section 440 of the sprayer system is typically positioned approximately midway between 2 walls 412 within the settling chamber. The knife 440 can be a vertical high pressure spray bar having jets aimed horizontally across toward the center of the settling chamber. When the servicing system is powered on the knife will cut a vertical slice through the collected debris. This vertical slice through the debris will work in conjunction with the floor spray bars to cause the structure of the debris to weaken.

The floor spray bars 221 will work to undermine and liquefy the debris from underneath while the knife 440 spray bar slices a vertical cut across the approximate center of the debris. Once the slice from the knife spray bar is adequately complete, the structure within the debris will fail causing the debris to collapse to the floor of the vault. Once the potential for the debris to bridge between the walls of the vault is nullified the floor spray bars will be fully able to liquefy the debris from the underside and flush all the debris toward the point in the chamber where it can be vacuumed out.

The floors 130, 230, 370 of the storm water treatment box/vault/systems can be sloped downward and away from the wall or walls 512 of the box/vault 100, 200, 300. Sloping the floors will enable gravity to influence the movement of water and solids toward the center of the settling zone where a vacuum will remove the solids from the vault. Both gravity and the kinetic energy of the water nozzles will direct solids toward the center of the settling zone.

One of the primary objectives of the HydroSlide serving system is to liquefy the sediment from underneath and thrust the debris toward the location in the settling chamber where it can be vacuumed out by a vacuum truck. This is accomplished by using water pumped into the servicing system at high pressure from equipment located outside the vault. Spray bars having a series of nozzles are positioned along the floor of the settling chamber. The water exiting the spray nozzles needs to be traveling at a sufficient velocity so that it can drill into the debris that has settled into the settling chamber. It is also important the nozzles be aimed parallel with the floor of the settling chamber.

If the nozzles of floor spray bars are not aimed parallel with the floor performance deficiencies can occur. If the nozzles are aimed too far upward the water jets will miss much the debris along the floor of the settling chamber. If the nozzles are not able to engage the sediment along the floor it will not be able to thrust this debris toward the location in the settling chamber where it can be vacuumed out. If the nozzles are aimed too low the water jets will hit onto the floor of the settling chamber. When the water jets hit onto the floor the velocity of the water jets are significantly reduced and the water jets will not be able to adequately drill into the debris.

A part of the sprayer servicing system are the sloped floors which aid in conveying debris toward the location in the settling chamber where it can be vacuumed out. A difficulty to overcome is that the angle of the sloped floors varies significantly due to differences in designs and workmanship. The time that it takes to install the sprayer service system needs to be minimized to avoid added expenses. For example; during a typical installation of a storm water treatment system a lot of heavy equipment and manpower is required, and the time to install treatment system can be very expensive. Having to take extra time to unsure that the nozzles of a spray bar are aimed correctly can create delays along with the extra costs associated with these delays.

Another issue of installation of the sprayer service system can be the skill level of the installation personnel. Having a feature of the service system that reduces the required skill level to install the servicing system correctly will aid with ensuring that all installs are done perfectly correct.

The aiming levers are a part of the floor spray bars and will solve the before mentioned issues. The aiming levers are parallel with the direction of the water jets along the spray bars. The aiming lever serves as physical and visual indicator that ensures that the nozzles are aimed parallel with the floor of the settling chamber. During the manufacturing of the spray bars there is a high level of quality control to ensure that the aiming levers are parallel with the nozzles along the spray bars. The technician installing the spray bars simply needs to make sure the aiming lever is pressed flat onto the floor. This can be accomplished by pushing down on the aiming lever until it hits onto the floor. Regardless of the angle of the floor, when the aiming lever is pressed down onto the floor the nozzles will be parallel with the floor. Because the process is so simple and quick, installation time and the required skill to install is minimized.

Spray Knife

In addition to the spray bars of the spray system are vertical pipe sections that function as a kind of knife. The knife will slice a vertical cut through the layer of solids in the settling zone of the storm water treatment system.

As debris accumulates in a settling chamber it can become highly compacted. In addition, sediment, leaves, and twigs will become integrated throughout the accumulated debris. The presence of leaves and twigs enhances the general structure of the accumulated debris.

During servicing of the lower settling chambers when the HydroSlide service system is powered on, what often happens to the collected debris is the jets that are aimed along the floor of the chamber will undermine the sediment without the majority of sediment collapsing to the floor. Essentially, what has happened is the structure of the sediment has allowed the jets aimed along the floor to drill through the sediment close to the floor, while the compacted debris above the floor jets bridges between the solid walls of the vault to support the bulk of the debris above the floor jets. When debris bridging occurs, the floor jets are not able to engage all the debris.

The knife section of the sprayer system is typically positioned approximately midway between 2 walls within the settling chamber. The knife is a vertical high pressure spray bar having jets aimed horizontally across toward the center of the settling chamber. When the servicing system is powered on the knife will cut a vertical slice through the collected debris. This vertical slice through the debris will work in conjunction with the floor spray bars to cause the structure of the debris to weaken.

The floor spray bars will work to undermine and liquefy the debris from underneath while the knife spray bar slices a vertical cut across the approximate center of the debris. Once the slice from the knife spray bar is adequately complete, the structure within the debris will fail causing the debris to collapse to the floor of the vault. Once the potential for the debris to bridge between the walls of the vault is nullified the floor spray bars will be fully able to liquefy the debris from the underside and flush all the debris toward the point in the chamber where it can be vacuumed out.

The Servicing Procedure for the Stormwater Polymer Treatment System:

Servicing can be performed by service technicians from outside the chamber/vault/box/system. The required equipment for servicing will be a vacuum service truck. A typical vacuum truck will have both a vacuum system to remove debris from inside the vault, a spray service wand for washing using water at high pressure, and a separate high pressure water supply that will be used to activate the service spray system. Proposed steps will be described.

Step 1: Open the access covers at the top of the vault.
Step 2: Open the screened lids of the screen system and using a vacuum truck, vacuum out all the solids collected in the screen system.
Step 3: Open all the bottom doors of the screen system. This will provide access to the lower settling chambers and access to the polymer logs.
Step 4: Reach into the vault using the reach tool and remove the polymer beam from the vault.
Step 5: Connect the high pressure water supply of the vacuum truck to the connector for the stormwater treatment system's lower service spray system.
Step 6: Vacuum out the water in the vault down to the layer of solids across the floor of the vault.
Step 7: Turn on the high pressure water supply of the vacuum truck to activate the spray system in the lower settling zone, and continue to vacuum out the vault. The spray system will liquefy the solids along the floor of the vault and direct these solids toward the vacuum.
Step 8: Once the solids in the lower settling zone have been removed, turn off the vacuum and the spray system.
Step 9: If the Stormwater Polymer Treatment System has more than one settling zone, repeat steps 5-8 for each of the settling zones.
Step 10: Replace the spent polymer logs along the polymer beam.
Step 11: Using the reach tool, re-insert the polymer beam into the Stormwater Polymer Treatment System.
Step 12: Close all the doors and lids of the screen system, and then close the access openings at the top of the vault. Servicing is complete Problems Solved by the Invention The novel invention provides solutions for many problems with existing systems that use polymer logs.
1. Problem: Large solids such as foliage can blind polymer logs from stormwater flow. When polymer logs become blinded by debris they do not erode adequately and polymer dosage is significantly reduced.
   Solution: A screen system was positioned so that large solids are prevented from making contact with the polymer log(s). The log(s) are shielded by the screen system.
2. Problem: Polymer log(s) can dry out when exposed to the air for extended periods of time. When the polymer logs become dried out the outside of the logs will crust over and harden. Once a polymer log has crusted over it is ruined and must be replaced.
   Solution: Positioning the polymer logs so that they remain permanently submerged in water in a settling zone will ensure that the polymer logs will never dry out.
3. Problem: Polymer logs require water flow to erode and adequately dose stormwater. If the polymer logs are not placed in such a way that they are not exposed to adequate turbulence, the required mixing will not occur resulting with inadequately polymerized stormwater.
   Solution: Placing the polymer logs adjacent to the inflow of the Stormwater Polymer Treatment System insures adequate turbulence. The area adjacent to the inflow pipe is always adequately turbulent within the treatment system.
4. Problem: Polymer logs require turbulence to adequately erode to achieve the proper dosage of polymer. However, calm water is required to enable fine particles to settle out of the water flow into lower settling zones. Having both adequately turbulent and calm zones within a stormwater treatment system is difficult to achieve.
   Solution: Because the polymer log(s) are placed adjacent to the inflow into the treatment system the required turbulence for polymer log erosion will be achieved. The settling zone(s) below the flow-line between the inflow and outflow openings of the treatment system are adequately sized and partitioned to create the necessary calm to enable ultra-fine particles to settle. Deflectors and baffles are specifically sized and positioned within the vault/box to enhance the calming of the water flow after the water has been polymerized.
5. Problem: If the screen system that shields the polymer log(s) becomes full and/or blinded by debris adequate water flow and turbulence around the polymer log(s) may not be achieved. If the water flow cannot reach the polymer log(s) the stormwater will not be adequately dosed with polymer.
   Solution: A gap in the bottom of the screen system adjacent and under the inflow opening will enable adequate water flow to be able to bypass the screen system. This gap is called the inflow gap. For the water flow passing through the inflow gap, to prevent suspending collected solids on the bottom of the vault and to direct this water flow toward the polymer logs, an inflow gap deflector will be placed directly below the inflow gap. This inflow gap deflector will direct the water flow that passes through the inflow gap horizontally below the screen system and toward the polymer log(s).
6. Problem: Solids that settle into the lower settling zones of the treatment system can be difficult and time consuming to remove for disposal. In addition, sending a technician into the vault to do service work requires the practice of confined space protocols to avoid safety issues. OSHA requirements for confined space entry can be expensive and time consuming. To compound the problem, the use of polymers will increase the quantity of solids that settling into these lower settling zone.
   Solution: A sophisticated spray system will be integrated into the invention so that the solids collected in the lower settling zones can be serviced more quickly and without having to send a technician into the vault to do the work. This spray system will liquefy the collected solids from underneath which can be accomplished quickly. In addition, the floors of the settling zones will be sloped down and away from the walls toward the center of the settling zone. A vacuum truck can much more easily remove these solids from the center of the settling zone. The invention saves time which in turn saves money.
7. Problem: The polymer logs will need to be replenished and replaced from time-to-time. It is more difficult to send a technician into a treatment system to do work, and sending a technician into a vault requires confined space protocols to be followed. These protocols are based on issues of safety and are OSHA required. Following these protocols is more expensive and time consuming.
   Solution: The Polymer log(s) can be attached to a removable beam that is positioned under the screen system and adjacent to the inflow opening. The bottom of the screen system just above the polymer log(s) will be hinged to open to give access to the polymer log(s). A service technician will be able to reach into the treatment system using a reach tool, hook onto the polymer beam, and remove the polymer beam from the vault. It will be much easier and safer to replenish the polymer beam with new polymer logs outside the vault rather than inside the vault. Once the polymer beam is replenished, the technician will be able to replace the polymer beam in the vault using the reach tool.

8. Problem: A treatment system that makes use of polymerized water requires detention time for the water flow within the treatment system. It takes time for ultra-fine particles to coagulate and settle out of the water flow. The more detention time the water has within the treatment system the better.

Solution: Making use of a flow restriction barrier in the Stormwater Polymer Treatment System that increases water detention time within the treatment system can be either fixed in place, or the barrier can be designed to float upward when the hydraulic grade line (hgl) reaches an engineered and specified elevation. If the flow restriction barrier is designed to float upward when the hgl reaches an engineered and specified elevation, the headloss created by the flow restriction barrier can be completely nullified. Making use of a flow restriction barrier that floats will enable the flow restriction to be placed inline with a stormdrain pipe without compromising the hydrology of the water shed. However, the heaviest concentration of pollutants within stormwater occurs in a rain event. So before the floating barrier begins to rise, the polymers will have sufficient time to enhance coagulation and settling for the most polluted portion of the rain event. In addition, most rain events will not be intense enough to raise the hgl in the Stormwater Polymer Treatment System to an elevation that will enable the flow restriction barrier to float. For example, in Tallahassee Fla., a city within the rainiest region in Florida, approximately 44% of all rain events are less than approximately 0.1 inches of rainfall.

The term "approximately" can be +/−10% of the amount referenced. Additionally, preferred amounts and ranges can include the amounts and ranges referenced without the prefix of being approximately.

While the polymer logs are generally shown as being a plurality of logs, the novel invention can be used with a single polymer log, and the like.

Although the above embodiments show and describe polymer logs arranged in vertical generally parallel, arrangements, the polymer logs can be arranged in horizontal configurations with tie lines going through the logs and supported by the support beam.

While the polymer logs are shown in generally a solid cylindrical configuration, the polymer logs can be cut up into separate parts, such as separate cubes, spheres, and other geometric shapes. The separate parts can be supported in a netting type bag and supported under the support beam.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A stormwater polymer treatment system, comprising:
    a chamber with a first end for inflowing stormwater and a second end for passing outflowing treated stormwater to exit the chamber, and a floor surface;
    a screen system adjacent to the first end of the chamber and above said floor surface for capturing large debris floatables as the inflowing storm water enters into the chamber; and
    at least one polymer log supported underneath the screen system for receiving the inflowing stormwater without the floatables, the at least one polymer log for causing solids in the inflowing stormwater to coagulate and drop to a bottom of the chamber.

2. The stormwater polymer treatment system of claim 1, wherein the screen system includes:
    a folding screen door having a lowered position for when the screen system is used to capture the floatables and a raised position for providing access to the at least one polymer log.

3. The stormwater polymer treatment system of claim 2, further comprising:
    an elongated rail for supporting the at least one polymer log therefrom, the rail being removable from the chamber with the at least one polymer log.

4. The stormwater polymer treatment system of claim 3, wherein the screen system includes:
    rail inserts for supporting outer ends of the elongated rail therein, wherein the down position of the folding screen door holds the elongated rail with the at least one polymer log underneath the screen system.

5. The stormwater polymer treatment system of claim 2, further comprising:
    an elongated servicing tool having a hook end for retrieving the at least one polymer log, wherein the servicing tool is adapted to allow for servicing of the at least one polymer log without having service technicians enter into the stormwater chamber.

6. The stormwater polymer treatment system of claim 1, further comprising:
    an inflow gap between a bottom of the screen system and a wall from which the stormwater enters into the chamber, the gap providing a bypass opening for water flow if the screen system becomes clogged with the floatables.

7. The stormwater polymer treatment system of claim 6, further comprising:
    a gap deflector for deflecting the water flow from the gap.

8. The stormwater polymer treatment system of claim 1, further comprising:
    an elongated servicing tool having a hook end for retrieving the polymer logs, wherein the servicing tool is adapted to allow for servicing of the at least one polymer log without having service technicians enter into the stormwater chamber.

9. The stormwater polymer treatment system of claim 1, further comprising:
    at least one fixed baffle below said screen and below and between a flow line between the inflow and outflow, for separating the space below the flow line into two or more settling chambers to allow for solids having weight heavier than water to settle in a lower zone in the plurality of chambers.

10. The stormwater polymer treatment system of claim 9, a floating skimmer downstream from said at least one fixed baffle.

11. The stormwater polymer treatment system of claim 1, further comprising:

the floor being a sloped floor; and a pressure water servicing system adjacent the floor of the treatment system, the pressure water servicing system being used to flush captured debris toward a center of the floor so that debris is washed down the sloped floor to central locations that are easily removable by an outside vacuum so that technicians are prevented from entering into chamber.

12. The stormwater polymer treatment system of claim 11, wherein the pressure water servicing system includes:

spray heads which pivot to be parallel to the sloped floor; and an alignment lever that allows for the spray heads to pivot to be parallel to the sloped floor.

13. The stormwater polymer treatment system of claim 11, wherein the pressure water servicing system further includes:

water pressure lines along bases of walls of the chamber; and vertical spray heads perpendicular to the water pressure lines for cutting into debris bridges formed in the chamber.

14. A method of servicing polymer logs in a water treatment system, comprising the steps of:

installing a screen system adjacent to a stormwater inflowing end and above a bottom of a stormwater treatment chamber;

supporting at least one polymer log underneath the screen system;

capturing large debris floatables as inflowing stormwater enters into the inflowing end of the stormwater treatment chamber with the screen system; and dosing the inflowing stormwater that has passed through the screen system with the at least one polymer log to cause solids in the inflowing stormwater to coagulate and drop to the bottom of the stormwater treatment chamber.

15. The method of claim 14, wherein the step of providing the screen system includes the step of:

providing a folding screen door on the screen system having a lowered position for when the screen system is used to capture the floatables and a raised position for providing access to the at least one polymer log.

16. The method of claim 15, further comprising the steps of:

providing an elongated rail for supporting the at least one polymer log therefrom, the rail being removable from the stormwater treatment chamber with the at least one polymer log; and providing rail inserts for supporting outer ends of the elongated rail therein, wherein the down position of the folding screen door holds the elongated rail with the at least one polymer log underneath the screen system.

17. The method of claim 16, further comprising the steps of:

providing an elongated servicing tool having a hook end for retrieving the polymer logs; and removing and replacing the polymer logs with the servicing tool hook end without having service technicians enter into the stormwater treatment chamber.

18. The method of claim 14, further comprising the step of:

providing an inflow gap between a bottom of the screen system and a wall from which the stormwater enters into the chamber; and passing water flow through the gap as a bypass opening when the screen system becomes clogged with the floatables.

19. The method of claim 18, further comprising the step of:

deflecting the water flow under the gap with a gap deflector.

20. The method of claim 14, further comprising the steps of:

providing a sloped floor in the stormwater treatment chamber;

providing a pressure water servicing system adjacent the floor of the stormwater treatment chamber;

providing pivotal spray heads attached to the pressure water servicing system, the pivotal spray heads having alignment levers which allows the spray heads to pivot downward to be parallel to the sloped floor; and providing vertical spray heads attached to the pressure water servicing system, the vertical spray heads being perpendicular to the pressure water servicing system adjacent to the sloped floor, wherein the pivotal spray heads and the vertical spray heads being used to flush captured debris toward a center of the floor so that debris is washed down the sloped floor to central locations that are easily removable by vacuums outside of the stormwater treatment chamber, and the vertical spray heads being used for cutting into debris bridges formed in the stormwater treatment chamber.

* * * * *